(12) United States Patent
Yasui et al.

(10) Patent No.: US 7,209,823 B2
(45) Date of Patent: Apr. 24, 2007

(54) CONTROLLER

(75) Inventors: Yuji Yasui, Saitama-ken (JP); Masahiro Sato, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/566,237

(22) PCT Filed: Aug. 9, 2004

(86) PCT No.: PCT/JP2004/011442

§ 371 (c)(1),
(2), (4) Date: Jan. 30, 2006

(87) PCT Pub. No.: WO2005/015325

PCT Pub. Date: Feb. 17, 2005

(65) Prior Publication Data

US 2006/0122761 A1    Jun. 8, 2006

(30) Foreign Application Priority Data

Aug. 8, 2003    (JP) .............................. 2003-289910

(51) Int. Cl.
*F01L 1/344*    (2006.01)
*G05B 13/02*    (2006.01)
*G06F 17/00*    (2006.01)

(52) U.S. Cl. .................................... 701/102; 123/90.15

(58) Field of Classification Search ................ 701/102, 701/114, 115; 123/90.15, 90.17

See application file for complete search history.

(56) References Cited

U.S. PATENT DOCUMENTS 4,064,846 A * 12/1977 Latsch et al. ............ 123/406.23
6,856,891 B2 * 2/2005 Yasui .......................... 701/102

FOREIGN PATENT DOCUMENTS

| JP | 2003-108202 A |   | 4/2003 |
| JP | 2003-195908 A |   | 7/2003 |
| JP | 2003-214227 A |   | 7/2003 |
| JP | 2004-100652 A | * | 4/2004 |

* cited by examiner

*Primary Examiner*—Hieu T. Vo
(74) *Attorney, Agent, or Firm*—Arent Fox PLLC

(57) ABSTRACT

A control system which is capable of enhancing the accuracy of control, when the output of a controlled object is controlled with a control algorithm to which is applied a modulation algorithm based on one of a $\Delta$ modulation algorithm, a $\Delta\Sigma$ modulation algorithm, and a $\Sigma\Delta$ modulation algorithm, even if the absolute value of an input value to the modulation algorithm continues to be larger than 1 for a long time. The control system 1 for controlling the cam phase Cain of an intake cam 5 includes an ECU 2. The ECU 2 calculates a limited value deviation r2 for control of the cam phase Cain by equations (1) to (10), modulates the limited value deviation r2 with an algorithm expressed by equations (11) to (13) based on the $\Delta\Sigma$ modulation algorithm to thereby calculate a modulation output u″ as a predetermined value $\pm R$ (R>|r2|), and calculates a control output Vcain to the electromagnetic variable cam phase mechanism 30 based on the predetermined value $\pm R$ (steps 5 and 6).

12 Claims, 20 Drawing Sheets

F I G. 7
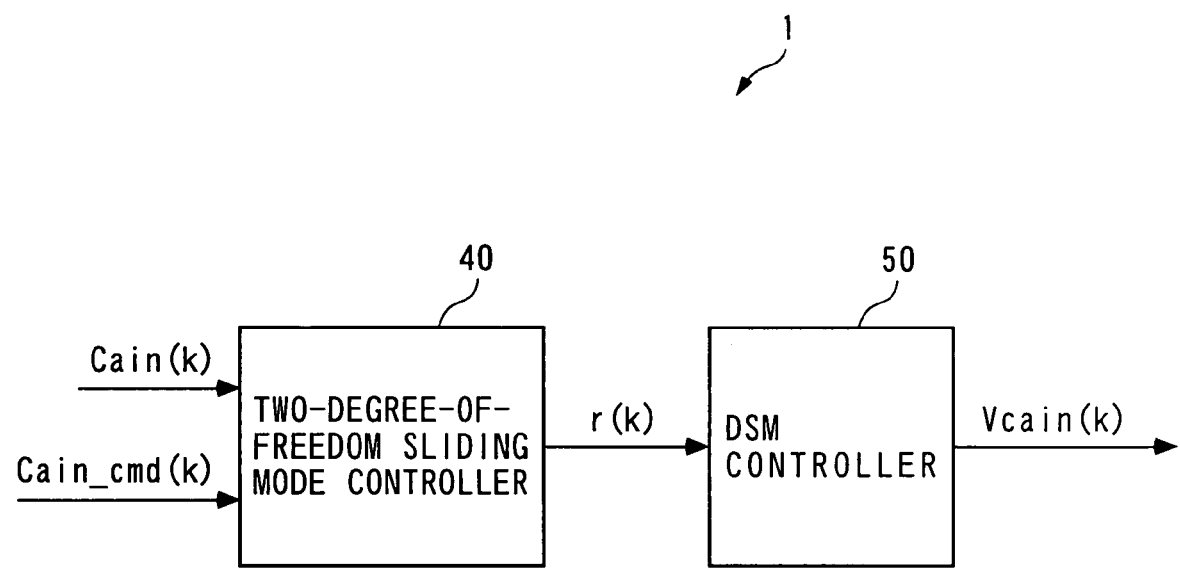

FIG. 8

$$r(k) = rff(k) + rrch(k) + radp(k) + rdamp(k) \quad \cdots \cdots (1)$$

$$rff(k) = \text{Cain\_cmd\_f}(k) + (1-\text{POLE}) \cdot \text{Cain\_cmd\_f}(k-1) - \text{POLE} \cdot \text{Cain\_cmd\_f}(k-2) \quad \cdots \cdots (2)$$

$$rrch(k) = -Krch \cdot \sigma s(k) \quad \cdots \cdots (3)$$

$$radp(k) = -Kadp \cdot \sum_{i=0}^{k} \sigma s(i) \quad \cdots \cdots (4)$$

$$rdamp(k) = -Kdamp \cdot [\text{Cain}(k) - \text{Cain}(k-1)] \quad \cdots \cdots (5)$$

$$\sigma s(k) = e(k) + \text{POLE} \cdot e(k-1) \quad \cdots \cdots (6)$$

$$e(k) = \text{Cain}(k) - \text{Cain\_cmd\_f}(k-1) \quad \cdots \cdots (7)$$

$$\text{Cain\_cmd\_f}(k) = -\text{POLE\_f} \cdot \text{Cain\_cmd\_f}(k-1) + (1+\text{POLE\_f}) \cdot \text{Cain\_cmd}(k) \quad \cdots \cdots (8)$$

FIG. 10

$$r1(k) = Lim(r(k)) \quad \cdots\cdots (9)$$

$$r2(k) = r1(k) - Vcain\_oft \quad \cdots\cdots (10)$$

$$\delta(k) = r2(k) - u''(k-1) \quad \cdots\cdots (11)$$

$$\sigma(k) = \sigma(k-1) + \delta(k) \quad \cdots\cdots (12)$$

$$u''(k) = fnl(\sigma(k)) \quad \cdots\cdots (13)$$

$$u(k) = KDSM \cdot u''(k) \quad \cdots\cdots (14)$$

$$Vcain(k) = Vcain\_oft + u(k) \quad \cdots\cdots (15)$$

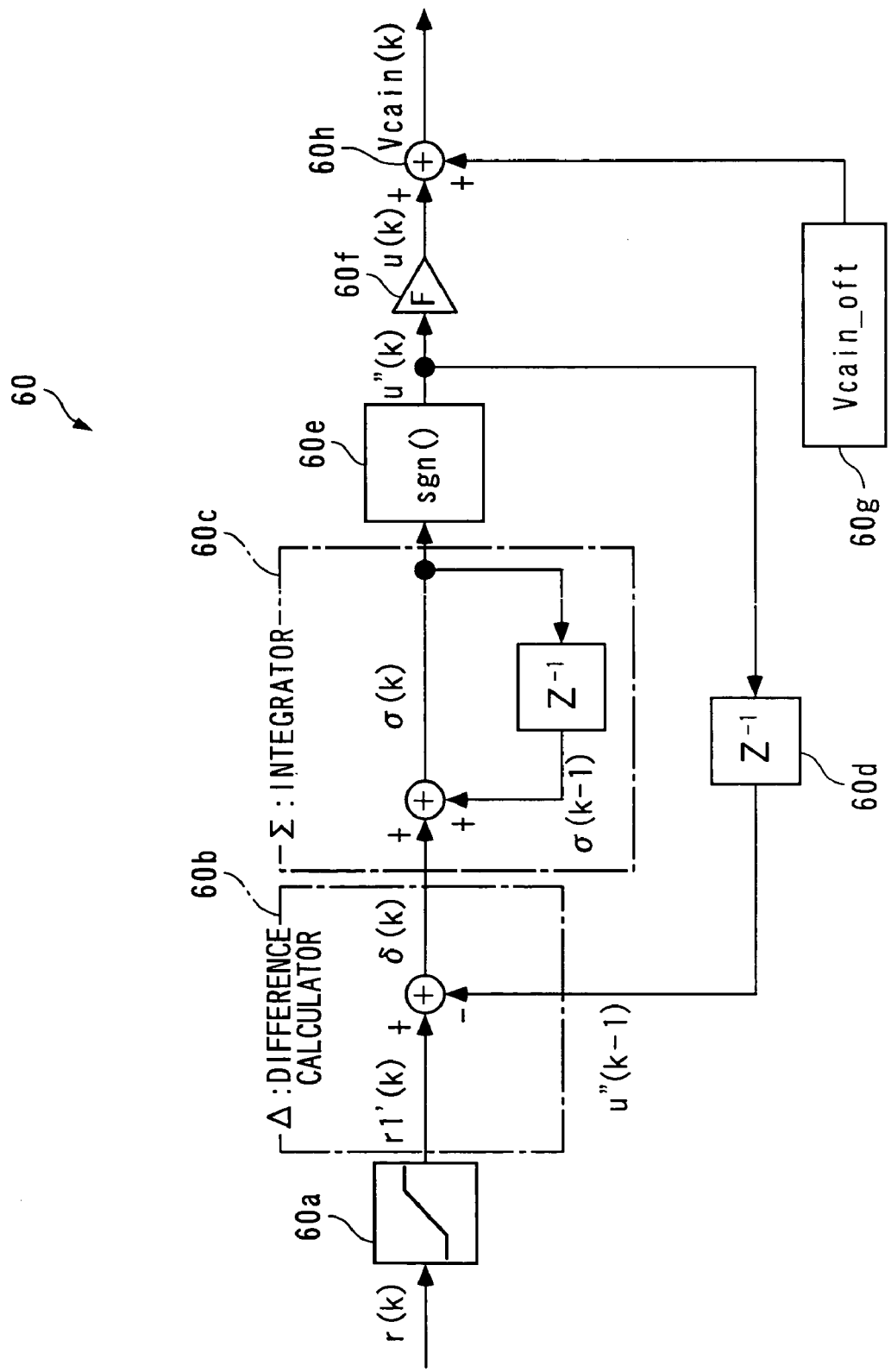

F I G. 1 2

$$r1'(k) = sat(r(k)) \quad \cdots (16)$$

$$\delta(k) = r1'(k) - u''(k-1) \quad \cdots (17)$$

$$\sigma(k) = \sigma(k-1) + \delta(k) \quad \cdots (18)$$

$$u''(k) = sgn(\sigma(k)) \quad \cdots (19)$$

$$u(k) = KDSM \cdot u''(k) \quad \cdots (20)$$

$$Vcain(k) = Vcain\_oft + u(k) \quad \cdots (21)$$

FIG. 13
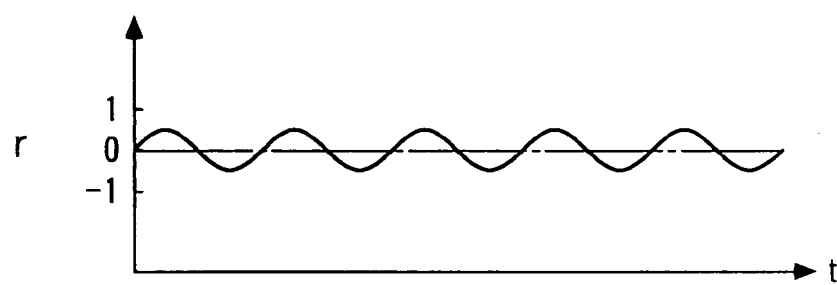
FIG. 14
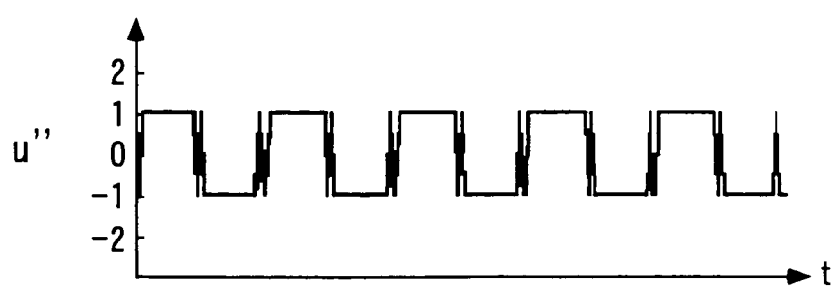
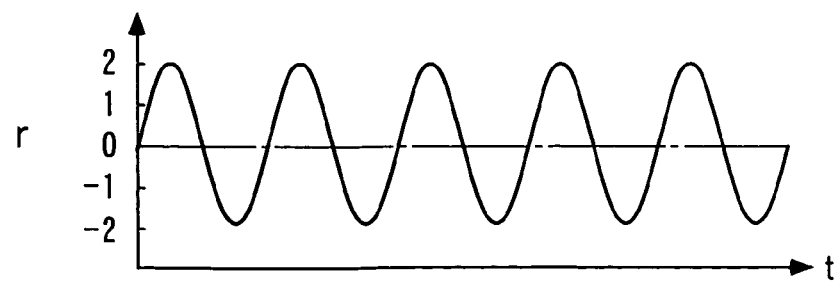

FIG. 16
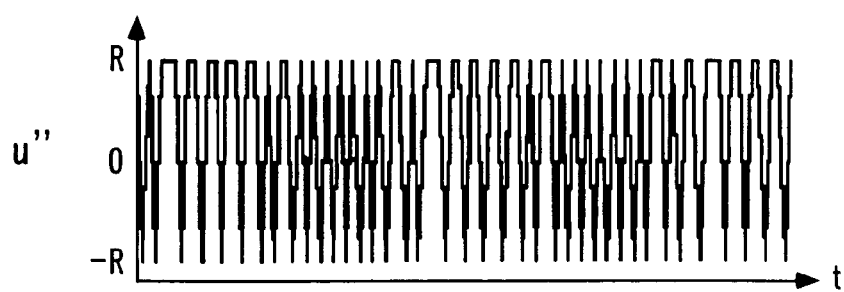
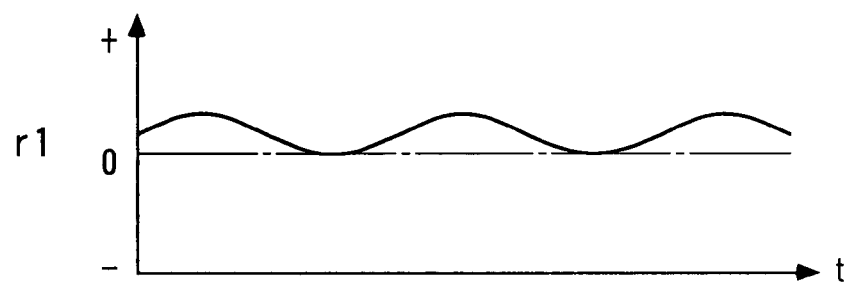
FIG. 17
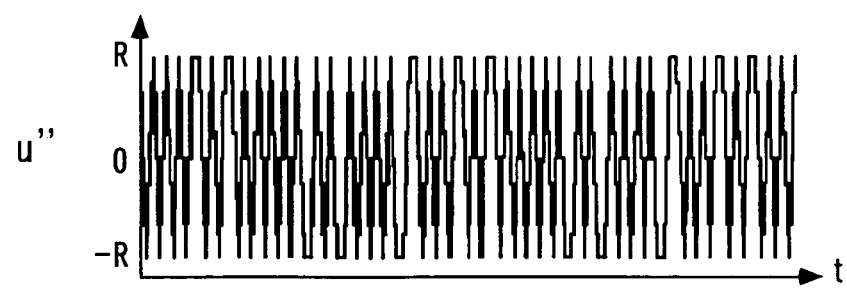
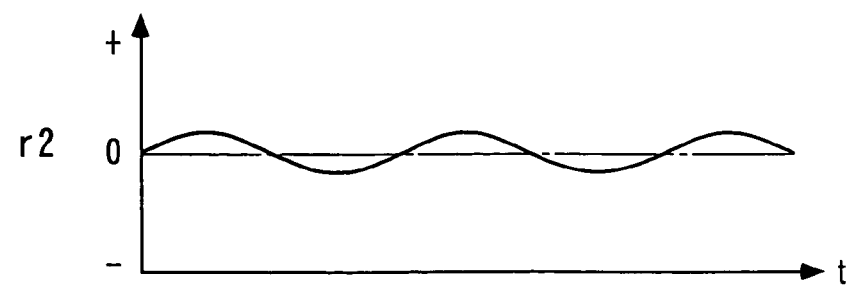

FIG. 22

$$r1(k) = Lim(r(k)) \quad\quad\quad (22)$$

$$r2(k) = r1(k) - Vcain\_oft \quad\quad\quad (23)$$

$$\sigma r(k) = \sigma r(k-1) + r2(k) \quad\quad\quad (24)$$

$$\sigma u''(k) = \sigma u''(k-1) + u''(k-1) \quad\quad\quad (25)$$

$$\delta(k) = \sigma r(k) - \sigma u''(k) \quad\quad\quad (26)$$

$$u''(k) = fnl(\delta(k)) \quad\quad\quad (27)$$

$$u(k) = KDSM \cdot u''(k) \quad\quad\quad (28)$$

$$Vcain(k) = Vcain\_oft + u(k) \quad\quad\quad (29)$$

F I G. 2 4

$$r1(k) = Lim(r(k)) \quad \cdots (30)$$

$$r2(k) = r1(k) - Vcain\_oft \quad \cdots (31)$$

$$\sigma u''(k) = \sigma u''(k-1) + u''(k-1) \quad \cdots (32)$$

$$\delta(k) = r2(k) - \sigma u''(k) \quad \cdots (33)$$

$$u''(k) = fnl(\delta(k)) \quad \cdots (34)$$

$$u(k) = KDSM \cdot u''(k) \quad \cdots (35)$$

$$Vcain(k) = Vcain\_oft + u(k) \quad \cdots (36)$$

CONTROLLER

CROSS-REFERENCE TO RELATED APPLICATION

This application is a National Stage entry of International Application No. PCT/JP2004/011442, filed Aug. 9, 2004, the entire specification claims and drawings of which are incorporated herewith by reference.

FIELD OF THE INVENTION

The present invention relates to a control system for controlling an output of a controlled object by calculating a control input to the controlled object with a control algorithm based on one of a $\Delta$ modulation algorithm, a $\Delta\Sigma$ modulation algorithm, and a $\Sigma\Delta$ modulation algorithm.

BACKGROUND ART

A control system of this kind has been proposed in Patent Literature 1 by the present applicant. This control system controls the air-fuel ratio of a mixture supplied to an internal combustion engine, and is comprised of an oxygen concentration sensor, a state predictor, and a DSM controller. In the control system, a predicted value PREVO2 of the difference between the output of the oxygen concentration sensor and a predetermined value is calculated by the state predictor, and inputted to the DSM controller to thereby calculate a target air-fuel ratio KCMD, and a fuel injection amount is calculated according to the target air-fuel ratio KCMD. The air-fuel ratio of a mixture supplied to the internal combustion engine is controlled using the fuel injection amount.

The DSM controller calculates the target air-fuel ratio KCMD according to the predicted value PREVO2 with a control algorithm to which is applied a $\Delta\Sigma$ modulation algorithm, and the control algorithm is expressed specifically by the following equations (a) to (g):

$$r(k) = -1 \cdot G \cdot PREVO2(k) \quad (a)$$

$$r1(k) = \mathrm{sat}(r(k)) \quad (b)$$

$$\delta(k) = r1(k) - u''(k-1) \quad (c)$$

$$\sigma(k) = \sigma(k-1) + \delta(k) \quad (d)$$

$$u''(k) = \mathrm{sgn}(\sigma(k)) \quad (e)$$

$$u(k) = F \cdot u''(k) \quad (f)$$

$$KCMD(k) = FLAFBASE + FLAFADP + u(k) \quad (g)$$

wherein $r(k)$ represents a reference input, $u''(k)$ a modulation output, and G and F gains. Further, $\mathrm{sat}(r(k))$ represents a saturation function. The value of $\mathrm{sat}(r(k))$ is set such that when $r(k) < -1$, $\mathrm{sat}(r(k)) = -1$ holds, when $-1 \leq r(k) \leq 1$, $\mathrm{sat}(r(k)) = r(k)$ holds, and when $r(k) > 1$, $\mathrm{sat}(r(k)) = 1$ holds. Further, $\mathrm{sgn}(\sigma(k))$ represents a sign function. The value of $\mathrm{sgn}(\sigma(k))$ is set such that when $\sigma(k) \geq 0$, $\mathrm{sgn}(\sigma(k)) = 1$ holds, and when $\sigma(k) < 0$, $\mathrm{sgn}(\sigma(k)) = -1$ holds.

As described above, in the control algorithm, the reference input $r(k)$ is limited by the saturation function $\mathrm{sat}(r(k))$ such that the absolute value thereof becomes not larger than a value of 1, and the modulation output $u''(k)$ is calculated based on the limited value $r1(k)$ thus limited, with the $\Delta\Sigma$ modulation algorithm of the equations (c) to (e). This is for the following reason: When the reference input $r(k)$ is applied to the $\Delta\Sigma$ modulation algorithm without being limited as described above, if the absolute value of the reference input $r(k)$ is larger than a value of 1, the absolute value of an integral value $\sigma(k)$ of the difference $\delta(k)$ increases, whereby even when the sign (positive or negative) of the difference $\delta(k)$ is inverted in accordance with inversion of the sign of the reference input $r(k)$, the sign of the modulation output $u''(k)$ is maintained without being inverted until the increased absolute value of the integral value $\sigma(k)$ decreases. That is, a dead time is generated between the inversion of the sign of the reference input $r(k)$ and the inversion of the sign of the modulation output $u''(k)$, which results in the degraded controllability. Therefore, the modulation output $u''(k)$ is calculated as described above in order to avoid such inconvenience.

[Patent Literature 1] Japanese Laid-Open Patent Publication (Kokai) No. 2004-70820

As in the above-described conventional control system, when the control input to the controlled object is calculated using the modulation output $u''(k)$ the sign of which is frequently inverted due to the characteristics of the $\Delta\Sigma$ modulation algorithm, the accuracy of control is higher as the ratio between respective frequencies of the inversion of the modulation output $u''(k)$ to a value of 1 and the inversion thereof to a value of $-1$ is closer to half and half. In other words, as the frequency of the inversion is smaller and a time period over which the modulation output $u''(k)$ is held at one of a value of 1 and a value of $-1$ becomes longer, the accuracy of the control becomes lower. In the above-described control system, the reference input $r(k)$ for control of the air-fuel ratio is set such that the absolute value thereof becomes equal to a value close to 1 (equivalent ratio corresponding to the stoichiometric air-fuel ratio), and therefore a state does not frequently occur in which the frequency of the inversion of the modulation output $u''(k)$ is small and at the same time the modulation output $u''(k)$ is held at one of a value of 1 and a value of $-1$ for a long time. However, the input value to the $\Delta\Sigma$ modulation algorithm sometimes assumes only one of the positive value and the negative value depending on the characteristics of the controlled object. In such a case, the time period over which the modulation output $u''(k)$ is held at one of a value of 1 and a value of $-1$ becomes longer. Also, depending on the characteristics of the controlled object, a state in which the absolute value of the reference input $r(k)$ input to the $\Delta\Sigma$ modulation algorithm is larger than a value of 1 sometimes continues for a long time. When such a controlled object is controlled by the above-described conventional control system, the limited value $r1(k)$ is held at a value of 1 or a value of $-1$ for a long time, which causes the difference $\delta(k)$ and the integral value $\sigma(k)$ to be held at the same value for a long time. In these cases, the switching behavior (inverting behavior) of the modulation output $u''$ which characterizes the $\Delta\Sigma$ modulation algorithm, is lost to reduce the frequency of the inversion of the modulation output $u''$ and hold the modulation output $u''$ at one of a value of 1 and a value of $-1$ for a longer time. This can result in the degraded accuracy of the control. This problem similarly occurs even when the $\Delta$ modulation algorithm or the $\Sigma\Delta$ modulation algorithm is used in place of the $\Delta\Sigma$ modulation algorithm.

The present invention has been made to provide a solution to the above-described problems, and a first object thereof is to provide a control system which is capable of enhancing the accuracy of control when the output of a controlled object is controlled with a control algorithm to which is applied a modulation algorithm based on one of a $\Delta$ modulation algorithm, a $\Delta\Sigma$ modulation algorithm, and a $\Sigma\Delta$ modulation algorithm, even if the absolute value of an input value to the control algorithm continue to be held larger than a value of 1 for a long time.

A second object of the present invention is to provide a control system which is capable of enhancing the accuracy of control when a controlled object is controlled with a control algorithm based on one of a Δ modulation algorithm, a ΔΣ modulation algorithm, and a ΣΔ modulation algorithm, even if an input value to the control algorithm assumes only one of a positive value and a negative value.

DISCLOSURE OF THE INVENTION

To attain the above first object, in a first aspect of the present invention, there is provided a control system for controlling an output of a controlled object by a control input to the controlled object, comprising control value-calculating means for calculating a control value for control of the output of the controlled object with a predetermined control algorithm, and control input-calculating means for calculating a modulation value by modulating the calculated control value with a predetermined modulation algorithm based on a ΔΣ modulation algorithm, and calculating the control input to the controlled object based on the calculated modulation value, wherein the control input-calculating means includes difference calculation for calculating a difference between the control value and the modulation value, in the predetermined modulation algorithm, and calculates the modulation value such that an absolute value thereof becomes equal to a predetermined value larger than a value of 1.

With the configuration of this control system, a control value for control of the output of a controlled object is calculated with a predetermined control algorithm, and the control value thus calculated is modulated with a predetermined modulation algorithm based on a ΔΣ modulation algorithm to thereby calculate a modulation value, and a control input to the controlled object is calculated based on the modulation value thus calculated. In this case, difference calculation for calculating the difference between the control value and the modulation value is included in the predetermined modulation algorithm, and the modulation value is calculated such that the absolute value thereof becomes equal to a predetermined value larger than a value of 1. Therefore, even when the absolute value of the control value continues to be larger than a value of 1 for a long time due to the characteristics of the controlled object, by properly setting the predetermined value, it is possible to avoid the difference between the control value and the modulation value by the difference calculation from being held at the same value for a long time. This makes it possible to calculate the modulation value as a value which is frequently inverted between the maximum value and the minimum value and of which the inversion to the maximum value and the inversion to the minimum value occur such that the ratio between the respective frequencies thereof becomes closer to half and half, so that it is possible to enhance the accuracy of control (it should be noted that throughout the specification, "calculation" e.g. in "calculation of the control value", "calculation of the modulation value", "calculation of the difference", and "calculation of the integral value" includes not only calculation of them according to a program but also generation of electric signals indicative of them).

To attain the above first object, in a second aspect of the present invention, there is provided a control system for controlling an output of a controlled object by a control input to the controlled object, comprising control value-calculating means for calculating a control value for control of the output of the controlled object with a predetermined control algorithm, and control input-calculating means for calculating a modulation value by modulating the calculated control value with a predetermined modulation algorithm based on a ΣΔ modulation algorithm, and calculating the control input to the controlled object based on the calculated modulation value, wherein the control input-calculating means includes first integral calculation for calculating an integral value of the modulation value, second integral calculation for calculating an integral value of the control value, and difference calculation for calculating a difference between the integral value of the control value and the integral value of the modulation value, in the predetermined modulation algorithm, and calculates the modulation value such that an absolute value thereof becomes equal to a predetermined value larger than a value of 1.

With the configuration of this control system, a control value for control of the output of a controlled object is calculated with a predetermined control algorithm, and the control value thus calculated is modulated with a predetermined modulation algorithm based on a ΣΔ modulation algorithm to thereby calculate a modulation value, and a control input to the controlled object is calculated based on the modulation value thus calculated. In this case, first integral calculation for calculating an integral value of the modulation value, second integral calculation for calculating an integral value of the control value, and difference calculation for calculating the difference between the integral value of the control value and the integral value of the modulation value are included in the predetermined modulation algorithm, and the modulation value is calculated such that the absolute value thereof becomes equal to a predetermined value larger than a value of 1. Therefore, even when the absolute value of the control value continues to be larger than a value of 1 for a long time due to the characteristics of the controlled object, by properly setting the predetermined value, it is possible to avoid the difference between the integral value of the control value and the integral value of the modulation value by the difference calculation from being held at the same value for a long time. This makes it possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control.

To attain the above first object, in a third aspect of the present invention, there is provided a control system for controlling an output of a controlled object by a control input to the controlled object, comprising control value-calculating means for calculating a control value for control of the output of the controlled object with a predetermined control algorithm, and control input-calculating means for calculating a modulation value by modulating the calculated control value with a predetermined modulation algorithm based on a Δ modulation algorithm, and calculating the control input to the controlled object based on the calculated modulation value, wherein the control input-calculating means includes integral calculation for calculating an integral value of the modulation value and difference calculation for calculating a difference between the control value and the integral value of the modulation value, in the predetermined modulation algorithm, and calculates the modulation value such that an absolute value thereof becomes equal to a predetermined value larger than a value of 1.

With the configuration of this control system, a control value for control of the output of a controlled object is calculated with a predetermined control algorithm, and the control value thus calculated is modulated with a predetermined modulation algorithm based on a $\Delta$ modulation algorithm to thereby calculate a modulation value, and a control input to the controlled object is calculated based on the modulation value thus calculated. In this case, integral calculation for calculating an integral value of the modulation value and difference calculation for calculating the difference between the control value and the integral value of the modulation value are included in the predetermined modulation algorithm, and the modulation value is calculated such that the absolute value thereof becomes equal to a predetermined value larger than a value of 1. Therefore, even when the absolute value of the control value continues to be larger than a value of 1 for a long time due to the characteristics of the controlled object, by properly setting the predetermined value, it is possible to avoid the difference between the control value and the integral value of the modulation value by the difference calculation from being held at the same value for a long time. This makes it possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control.

Preferably, in the control systems according to the first to third aspects of the invention, the predetermined value is set to a value an absolute value of which is larger than an absolute value of the control value.

With the configuration of this preferred embodiment, it is possible to avoid the difference between the control value and the modulation value, the difference between the integral value of the control value and that of the modulation value, or the difference between the control value and the integral value of the modulation value, by the difference calculation, from being held at the same value for a long time, thereby making it possible to further enhance the accuracy of the control.

To attain the above first object, in a fourth aspect of the present invention, there is provided a control system for controlling a cam phase of at least one of an intake cam and an exhaust cam for opening and closing an intake valve and an exhaust valve of an internal combustion engine, respectively, with respect to a crankshaft, comprising an electromagnetic variable cam phase mechanism that includes an electromagnet and changes the cam phase by an electromagnetic force of the electromagnet, control value-calculating means for calculating a control value for control of the cam phase with a predetermined control algorithm, and control input-calculating means for calculating a modulation value by modulating the calculated control value with a predetermined modulation algorithm based on a $\Delta\Sigma$ modulation algorithm, and calculating a control input to the electromagnetic variable cam phase mechanism based on the calculated modulation value, wherein the control input-calculating means includes difference calculation for calculating a difference between the control value and the modulation value, in the predetermined modulation algorithm, and calculates the modulation value such that an absolute value thereof becomes equal to a predetermined value larger than a value of 1.

With the configuration of this control system, a control value for control of a cam phase is calculated with a predetermined control algorithm, a modulation value is calculated by modulating the control value thus calculated, with a predetermined modulation algorithm based on a $\Delta\Sigma$ modulation algorithm, and a control input to the electromagnetic variable cam phase mechanism is calculated based on the modulation value thus calculated. This kind of control value for control of the cam phase is sometimes set to such a value an absolute value of which continues to be larger than a value of 1 for a long time. Even in such a case, according to the control system, since difference calculation for calculating the difference between the control value and the modulation value is included in the predetermined modulation algorithm, and the modulation value is calculated such that an absolute value thereof becomes equal to a predetermined value larger than a value of 1, by properly setting the predetermined value, it is possible to avoid the difference between the control value and the modulation value by the difference calculation from being held at the same value for a long time. Thus, it is possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control.

Furthermore, the electromagnetic variable cam phase mechanism is used as a mechanism for changing the cam phase, and hence differently from the case where a hydraulically-driven variable cam phase mechanism is employed, it is possible not only to properly control the cam phase from the start without waiting for the rise of oil pressure but also to prevent the mechanism from being adversely affected by oil temperature. Moreover, compared with the hydraulically-driven variable cam phase mechanism, it is possible to shorten a dead time and ensure higher responsiveness. This makes it possible to further enhance the accuracy of the control.

To attain the above first object, in a fifth aspect of the present invention, there is provided a control system for controlling a cam phase of at least one of an intake cam and an exhaust cam for opening and closing an intake valve and an exhaust valve of an internal combustion engine, respectively, with respect to a crankshaft, comprising an electromagnetic variable cam phase mechanism that includes an electromagnet and changes the cam phase by an electromagnetic force of the electromagnet, control value-calculating means for calculating a control value for control of the cam phase with a predetermined control algorithm, and control input-calculating means for calculating a modulation value by modulating the calculated control value with a predetermined modulation algorithm based on a $\Sigma\Delta$ modulation algorithm, and calculating a control input to the electromagnetic variable cam phase mechanism based on the calculated modulation value, wherein the control input-calculating means includes first integral calculation for calculating an integral value of the modulation value, second integral calculation for calculating an integral value of the control value, and difference calculation for calculating a difference between the integral value of the control value and the integral value of the modulation value, in the predetermined modulation algorithm, and calculates the modulation value such that an absolute value thereof becomes equal to a predetermined value larger than a value of 1.

With the configuration of this control system, a control value for control of a cam phase is calculated with a predetermined control algorithm, a modulation value is calculated by modulating the control value thus calculated, with a predetermined modulation algorithm based on a ΣΔ modulation algorithm, and a control input to the electromagnetic variable cam phase mechanism is calculated based on the modulation value thus calculated. As described above, this kind of control value for control of the cam phase is sometimes set to a value the absolute value of which continues to be larger than a value of 1 for a long time. Even in such a case, according to the control system, since first and second integral calculations for calculating an integral value of the modulation value and an integral value of the control value, respectively, and difference calculation for calculating the difference between the integral value of the control value and the integral value of the modulation value are included in the predetermined modulation algorithm, and the modulation value is calculated such that the absolute value thereof becomes equal to a predetermined value larger than a value of 1, by properly setting the predetermined value, it is possible to avoid the difference between the integral value of the control value and the integral value of the modulation value by the difference calculation from being held at the same value for a long time. Thus, it is possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control.

Furthermore, the electromagnetic variable cam phase mechanism is used as a mechanism for changing the cam phase, and hence as described above, differently from the case where a hydraulically-driven variable cam phase mechanism is employed, it is possible not only to properly control the cam phase from the start of the engine without waiting for the rise of oil pressure but also to prevent the mechanism from being adversely affected by oil temperature. Moreover, compared with the hydraulically-driven variable cam phase mechanism, it is possible to shorten a dead time and ensure higher responsiveness. This makes it possible to further enhance the accuracy of the control.

To attain the above first object, in a sixth aspect of the present invention, there is provided a control system for controlling a cam phase of at least one of an intake cam and an exhaust cam for opening and closing an intake valve and an exhaust valve of an internal combustion engine, respectively, with respect to a crankshaft, comprising an electromagnetic variable cam phase mechanism that includes an electromagnet and changes the cam phase by an electromagnetic force of the electromagnet, control value-calculating means for calculating a control value for control of the cam phase with a predetermined control algorithm, and control input-calculating means for calculating a modulation value by modulating the calculated control value with a predetermined modulation algorithm based on a Δ modulation algorithm, and calculating a control input to the electromagnetic variable cam phase mechanism based on the calculated modulation value, wherein the control input-calculating means includes integral calculation for calculating an integral value of the modulation value and difference calculation for calculating a difference between the control value and the integral value of the modulation value, in the predetermined modulation algorithm, and calculates the modulation value such that an absolute value thereof becomes equal to a predetermined value larger than a value of 1.

With the configuration of this control system, a control value for control of a cam phase is calculated with a predetermined control algorithm, a modulation value is calculated by modulating the control value thus calculated, with a predetermined modulation algorithm based on a Δ modulation algorithm, and a control input to the electromagnetic variable cam phase mechanism is calculated based on the modulation value thus calculated. As described above, this kind of control value for control of the cam phase is sometimes set to a value the absolute value of which continues to be larger than a value of 1 for a long time. Even in such a case, according to the control system, since integral calculation for calculating an integral value of the modulation value and difference calculation for calculating the difference between the control value and the integral value of the modulation value are included in the predetermined modulation algorithm, and the modulation value is calculated such that the absolute value thereof becomes equal to a predetermined value larger than a value of 1, by properly setting the predetermined value, it is possible to avoid the difference between the control value and the integral value of the modulation value by the difference calculation from being held at the same value for a long time. Thus, it is possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control.

Furthermore, the electromagnetic variable cam phase mechanism is used as a mechanism for changing the cam phase, and hence as described above, differently from the case where a hydraulically-driven variable cam phase mechanism is employed, it is possible not only to properly control the cam phase from the start without waiting for the rise of oil pressure but also to prevent the mechanism from being adversely affected by oil temperature. Moreover, compared with the hydraulically-driven variable cam phase mechanism, it is possible to shorten a dead time and ensure higher responsiveness. This makes it possible to further enhance the accuracy of the control.

Preferably, in the control systems according to the fourth to sixth aspects of the invention, the predetermined value is set to a value the absolute value of which becomes larger than the absolute value of the control value.

With the configuration of this preferred embodiment, it is possible to obtain the same advantageous effects as provided by the control system according to the above-described preferred embodiment.

To attain the above second object, in a seventh aspect of the present invention, there is provided a control system for controlling an output of a controlled object to a target value by a control input to the controlled object, comprising output-detecting means for detecting the output of the controlled object, target value-setting means for setting the target value, control value-calculating means for calculating a control value for controlling the detected output of the controlled object to the set target value, with a predetermined control algorithm, difference-calculating means for calculating a difference between the calculated control value and a first predetermined value, and control input-calculating means for calculating a modulation value by modulating the calculated difference with an algorithm based on one of a Δ modulation algorithm, a ΔΣ modulation algorithm, and a ΣΔ modulation algorithm, and calculating the control input to the controlled object based on the calculated modulation value.

With the configuration of this control system, a control value for controlling a detected output of a controlled object to a set target value is calculated with a predetermined control algorithm, and further the difference between the calculated control value and a first predetermined value is modulated with an algorithm based on one of a Δ modulation algorithm, a ΔΣ modulation algorithm, and a ΣΔ modulation algorithm, whereby the modulation value is calculated, and a control input to the controlled object is calculated based on the modulation value thus calculated. As described above, the modulation value is calculated by modulating the difference between the control value and the first predetermined value with the algorithm based on one of the Δ modulation algorithm, the ΔΣ modulation algorithm, and the ΣΔ modulation algorithm. Therefore, even when the control value is calculated only as a positive value or a negative value due to the characteristics of the controlled object, by properly setting the first predetermined value, it is possible to calculate the difference as a value varying between the positive value and the negative value. This makes it possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control.

Preferably, the control input-calculating means calculates the control input to the controlled object as a sum of the modulation value and a second predetermined value.

As in the control system according to the seventh aspect, when the modulation value has a characteristic that it is frequently inverted between a maximum value and a minimum value thereof, the control input calculated based on the modulation value sometimes exhibits a characteristic that it is frequently inverted between a positive value and a negative value. When the control input is inverted between a positive value and a negative value as described above, controllability and control efficiency (energy efficiency) are sometimes degraded depending on the characteristic of a controlled object. In such a case, it is desirable to control the control input such that it varies only within a predetermined range on the positive value side or the negative value side from the viewpoint of controllability and control efficiency. In view of this, with the configuration of this preferred embodiment, the control input to the controlled object is calculated as the sum of the modulation value and a second predetermined value. Therefore, by properly setting the second predetermined value, it is possible to calculate the control input as a value which varies only within a predetermined range on the positive value side or only within a predetermined range on the negative value side. This makes it possible to enhance both controllability and control efficiency.

To attain the above second object, in an eighth aspect of the present invention, there is provided a control system for controlling a cam phase of at least one of an intake cam and an exhaust cam for opening and closing an intake valve and an exhaust valve of an internal combustion engine, respectively, with respect to a crankshaft, to a target cam phase, comprising an electromagnetic variable cam phase mechanism that includes an electromagnet and changes the cam phase within a predetermined range by an electromagnetic force of the electromagnet, while holding the cam phase at one of limit values defining the predetermined range when the electromagnetic force is not acting, cam phase-detecting means for detecting the cam phase, target cam phase-setting means for setting the target cam phase, control value-calculating means for calculating a control value for controlling the detected cam phase to the set target cam phase, with a predetermined control algorithm, difference-calculating means for calculating a difference between the calculated control value and a first predetermined value, and control input-calculating means for calculating a modulation value by modulating the calculated difference with an algorithm based on one of a Δ modulation algorithm, a ΔΣ modulation algorithm, and a ΣΔ modulation algorithm, and calculating a control input to the electromagnetic variable cam phase mechanism based on the calculated modulation value.

With the configuration of this control system, a control value for controlling a detected cam phase to a set target cam phase is calculated with a predetermined control algorithm, and further the difference between the calculated control value and a first predetermined value is modulated with an algorithm based on one of a Δ modulation algorithm, a ΔΣ modulation algorithm, and a ΣΔ modulation algorithm, whereby a modulation value is calculated, and a control input to an electromagnetic variable cam phase mechanism is calculated based on the modulation value thus calculated. In this case, the electromagnetic variable cam phase mechanism is configured to change the cam phase within a predetermined range by an electromagnetic force of the electromagnet, while holding the cam phase at one of limit values defining the predetermined range when the electromagnetic force is not acting. Therefore, the control value for controlling the cam phase to the target cam phase is only required to be a value for generating the electromagnetic force, and can be calculated as values on both the positive and negative sides. However, when the sign of voltage applied to the electromagnet is inverted, a state occurs in which the direction of magnetic flux is inverted. This causes magnetic fluxes in the different directions to interfere with each other to thereby produce a state in the electromagnetic forces are cancelled with each other. To avoid this inconvenience, it is necessary to calculate the control value as a value only on the positive side or the negative side.

Even when the control value is calculated as a value only on the positive side or the negative side as described above, the modulation value is calculated by modulating the difference between the control value and the first predetermined value with an algorithm based on one of the Δ modulation algorithm, the ΔΣ modulation algorithm, and the ΣΔ modulation algorithm, and hence, by properly setting the first predetermined value, it is possible to calculate the difference as a value inverted between the positive side and the negative side. This makes it possible to calculate the modulation value as a value which is frequently inverted between the maximum value and the minimum value and of which the inversion to the maximum value and the inversion to the minimum value occur such that the ratio between the respective frequencies thereof becomes closer to half and half, thereby making it possible to enhance the accuracy of the control. Furthermore, the electromagnetic variable cam phase mechanism is used as a mechanism for changing the cam phase, and hence differently from the case where a hydraulically-driven variable cam phase mechanism is employed, it is possible not only to properly control the cam phase from the start of the engine without waiting for the rise of oil pressure but also to prevent the mechanism from being adversely affected by oil temperature. Moreover, compared with the hydraulically-driven variable cam phase mechanism, it is possible to shorten a dead time and ensure higher responsiveness. This makes it possible to further enhance the accuracy of the control.

Preferably, the control input-calculating means calculates the control input to the electromagnetic variable cam phase mechanism as a sum of the modulation value and a second predetermined value.

As in the control system according to the eighth aspect, when the modulation value has a characteristic that it is frequently inverted between a maximum value and a minimum value thereof, the control input calculated based on the modulation value sometimes has a characteristic that it is frequently inverted between a positive value and a negative value. When the control input is frequently inverted between a positive value and a negative value as described above, a state of the electromagnet occurs in which the direction of the magnetic flux is frequently inverted. This causes magnetic fluxes in the different directions to interfere with each other to thereby produce a state in the electromagnetic forces are cancelled with each other, which results in the degraded power efficiency and controllability. In view of this, with the configuration of this preferred embodiment, the control input to the electromagnetic variable cam phase mechanism is calculated as the sum of the modulation value and a second predetermined value. Therefore, by properly setting the second predetermined value, it is possible to calculate the control input as a value which varies only within a predetermined range on the positive value side or the negative value side. This makes it possible to avoid the inversion in the direction of the magnetic flux, thereby making it possible to enhance both the power efficiency and the controllability.

BRIEF DESCRIPTION OF THE DRAWINGS

FIG. 7 A block diagram showing the configuration of the control system according to the first embodiment;

FIG. 8 A diagram showing a control algorithm for a two-degree-of-freedom sliding mode controller;

FIG. 10 A diagram showing a control algorithm for the DSM controller;

FIG. 11 A block diagram showing the configuration of a controller of a comparative example;

FIG. 12 A diagram showing a control algorithm for the controller of the comparative example;

FIG. 13 A timing diagram showing an example of operation of the controller of the comparative example in the case where the absolute value of a reference input r thereto is smaller than a value of 1;

FIG. 14 A timing diagram showing an example of operation of the controller of the comparative example in the case where the absolute value of the reference input r thereto is not smaller than a value of 1;

FIG. 16 A timing diagram showing an example of operation of the DSM controller in the case where a limited value r1 is inputted to a $\Delta\Sigma$ modulation algorithm in place of a limited value deviation r2 for comparison;

FIG. 17 A timing diagram showing an example of operation of the DSM controller;

FIG. 22 A diagram showing a control algorithm for an SDM controller;

FIG. 24 A diagram showing a control algorithm for a DM controller; and

BEST MODE FOR CARRYING OUT THE INVENTION

Figure 1:
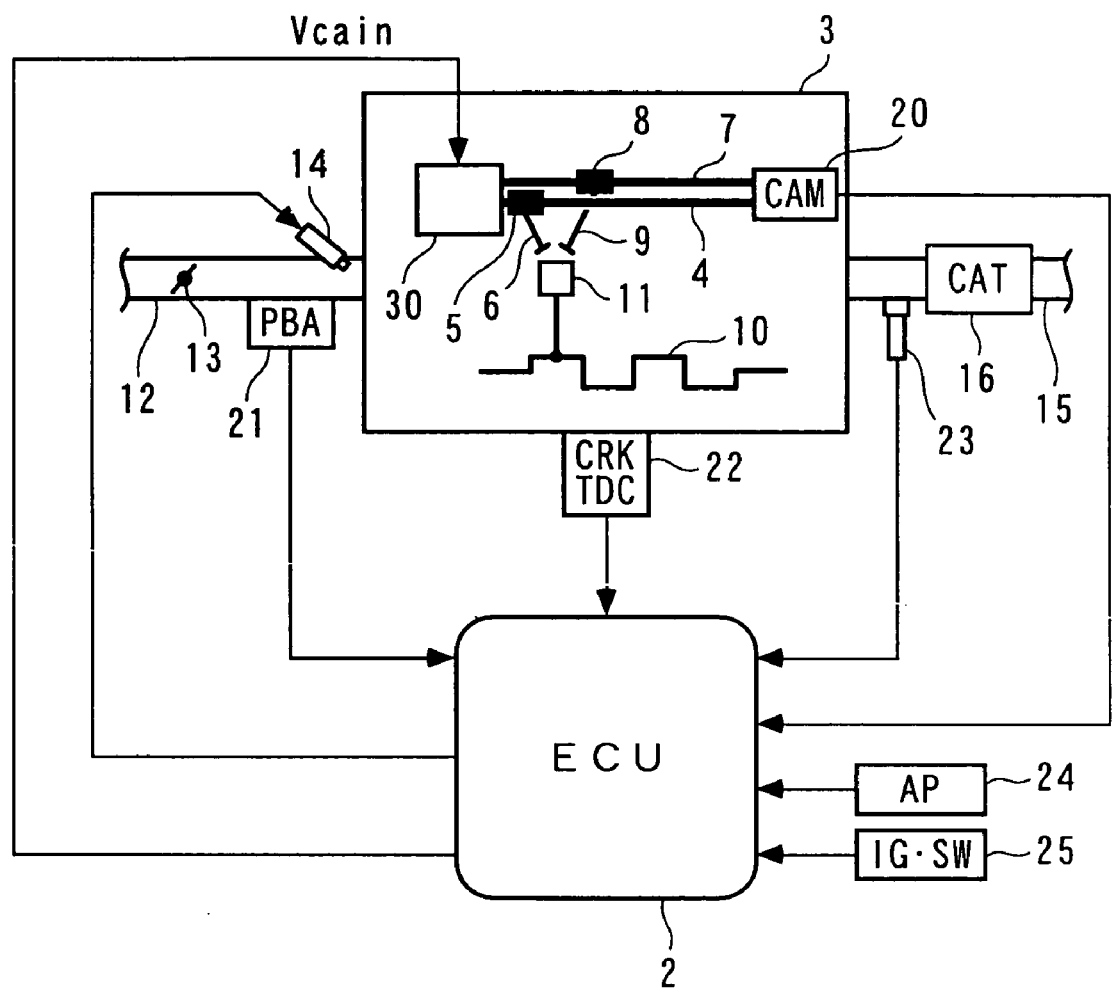
FIG. 1 A diagram schematically showing the arrangement of a control system according to a first embodiment of the present invention and an internal combustion engine to which is applied the control system.

Hereafter, a control system according a first embodiment of the present invention will be described with reference to the drawings. The control system according to the present embodiment controls an actual phase Cain of an intake cam of an internal combustion engine with respect to a crankshaft (hereinafter referred to as "the cam phase Cain"), and an object controlled by the control system corresponds to a system that outputs the cam phase Cain (output of the controlled object) in response to a control input Vcain, described hereinafter, inputted thereto. Referring to FIG. 1, the control system 1 is comprised of an electromagnetic variable cam phase mechanism 30 that changes the cam phase Cain, and an ECU 2 that controls the electromagnetic variable cam phase mechanism 30. The ECU 2 carries out a cam phase control process, as described hereinafter.

The internal combustion engine (hereinafter referred to as "the engine") 3 is a four-cycle DOHC gasoline engine, and includes an intake camshaft 4 and an exhaust camshaft 7. The intake camshaft 4 has intake cams 5 that actuate respective intake valves 6 associated therewith to open and close the same, and the exhaust camshaft 7 has exhaust cams 8 that actuate respective exhaust valves 9 associated therewith to open and close the same.

The intake camshaft 4 has a sprocket 4a coaxially and rotatably disposed thereabout. The sprocket 4a is connected to the crankshaft 10 via a timing belt, not shown, and further connected to the intake camshaft 4 via a planetary gear device 31, described hereinafter, of the above-described electromagnetic variable cam phase mechanism 30. With the above arrangement, the intake camshaft 4 performs one rotation per two rotations of the crankshaft 10. Further, the exhaust camshaft 7 includes a sprocket (not shown) integrally formed therewith, and is also connected to the crankshaft 10 via the sprocket and a timing belt, not shown, to thereby perform one rotation per two rotations of the crankshaft 10.

Figure 2:
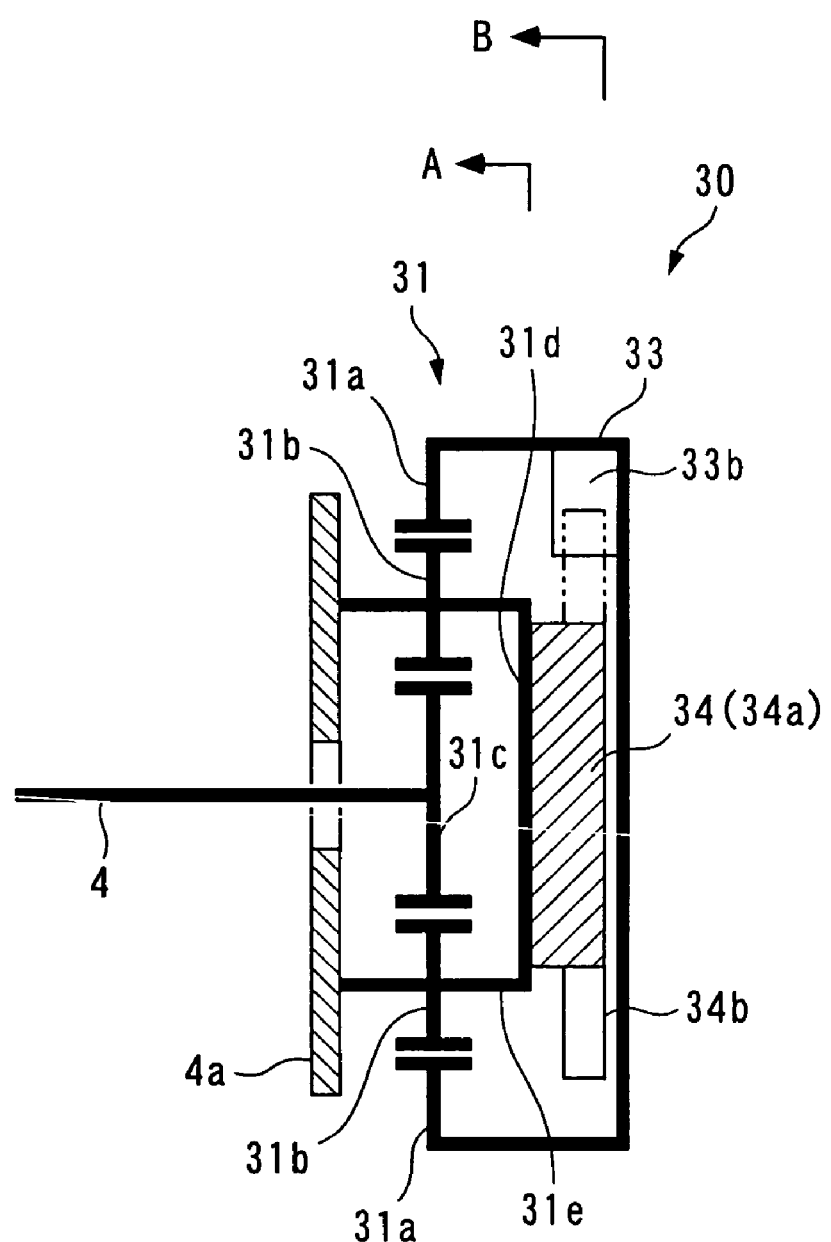
FIG. 2 A cross-sectional view schematically showing the arrangement of an electromagnetic variable cam phase mechanism.
Figure 3:
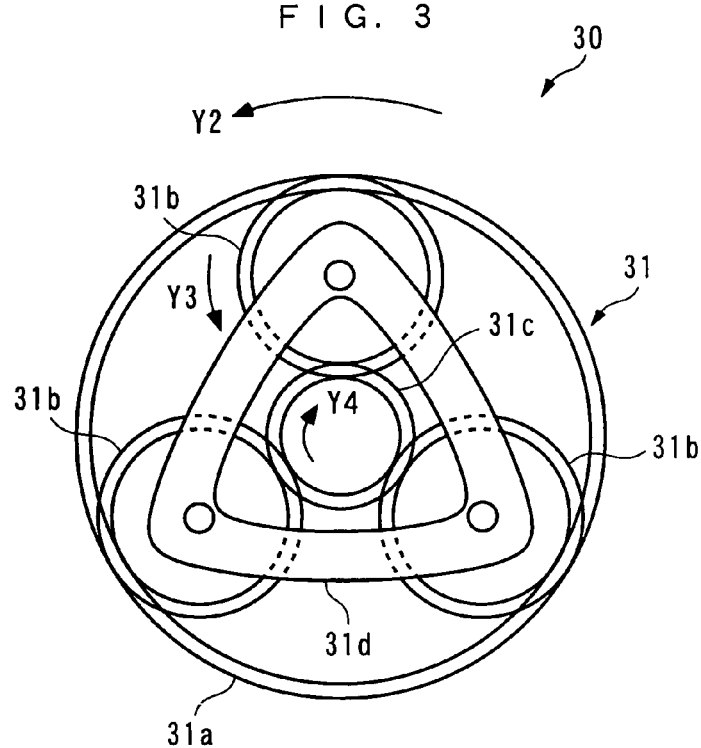
FIG. 3 A diagram showing a planetary gear device, as viewed from a direction indicated by line A—A in FIG. 2.
Figure 4:
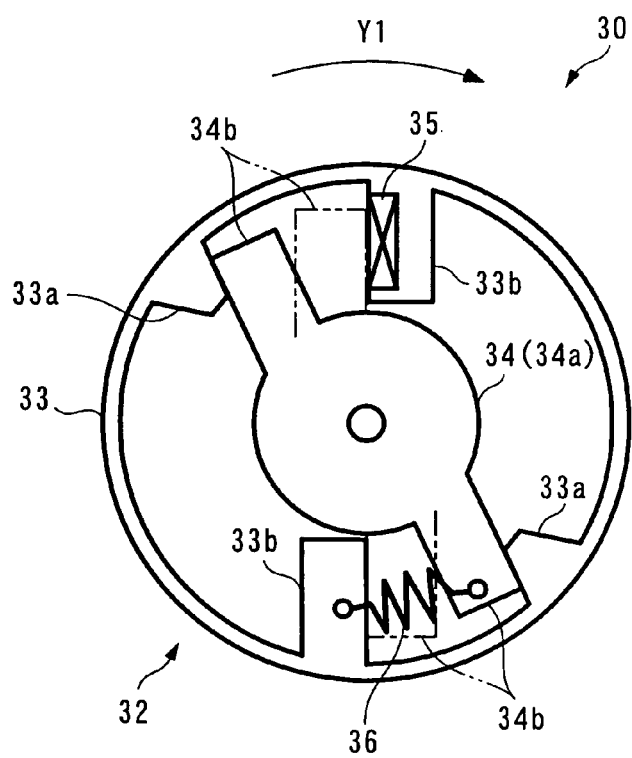
FIG. 4 A diagram showing an electromagnetic brake, as viewed from a direction indicated by line B—B in FIG. 2.

The electromagnetic variable cam phase mechanism 30 continuously or steplessly changes the cam phase Cain of the intake camshaft 4, i.e. that of each intake cam 5, with respect to the crankshaft 10 within a predetermined range (range between a most retarded value Cainrt and a most advanced value Cainad), and includes the planetary gear device 31 and an electromagnetic brake 32, as shown in FIGS. 2 to 4.

The planetary gear device 31 transmits rotation between the intake camshaft 4 and the sprocket 4a, and is comprised of a ring gear 31a, three planetary pinion gears 31b, a sun gear 31c, and a planetary carrier 31d. The ring gear 31a is connected to an outer casing 33, described hereinafter, of the electromagnetic brake 32 such that the ring gear 31a rotates coaxially and in unison with the outer casing 33. Further, the sun gear 31c is mounted to a distal end of the intake camshaft 4 such that the sun gear 31c rotates coaxially and in unison with the intake camshaft 4.

On the other hand, the planetary carrier 31d is formed to have an approximately triangular shape, and shafts 31e protrude from respective three corner portions of the planetary carrier 31d. The planetary carrier 31d is configured such that it is connected to the sprocket 4a via the shafts 31e, whereby it rotates coaxially and in unison with the sprocket 4a.

The planetary pinion gears 31b are rotatably supported on the shafts 31e of the planetary carrier 31d, respectively, and each arranged between the sun gear 31c and the ring gear 31a such that they always mesh with the sun gear 31c and the ring gear 31a.

Furthermore, the electromagnetic brake 32 is comprised of the outer casing 33, a core 34, an electromagnet 35, and a return spring 36. The outer casing 33 is formed to be hollow and has the core 34 disposed therein such that the core 34 is pivotally movable relative to the outer casing 33. The core 34 has a circular base portion 34a, and arms 34b and 34b radially extending therefrom. The base portion 34a of the core 34 is mounted on the planetary carrier 31d, whereby the core 34 rotates coaxially and in unison with the planetary carrier 31d.

On the other hand, a total of two pairs of most retarded position stoppers 33a and most advanced position stoppers 33b are formed on the inner peripheral surface of the outer casing 33 with a space between each pair of a most retarded position stopper 33a and a most advanced position stopper 33b. Each arm 34b of the core 34 is disposed between the pair of the stoppers 33a and 33b, whereby the core 34 is configured such that it is pivotally movable relative to the outer casing 33 between the most retarded position (position indicated by solid lines in FIG. 4) where the arm 34b is brought into abutment with the most retarded position stopper 33a and held thereat, and the most advanced position (position indicated by a two-dot chain lines in FIG. 4) where the arm 34b is brought into abutment with the most advanced position stopper 33b and held thereat.

Further, the return spring 36 is stretched between one of the most advanced position stopper 33b and the arm 34b opposed to the stopper 33b in a compressed state. The arm 34b is urged toward the most retarded position stopper 33a by the urging force of the return spring 36.

On the other hand, the electromagnet 35 is mounted to the most advanced position stopper 33b on a side opposite to the return spring 36, and disposed in an end of this most advanced position stopper 33b opposed to the arm 34b in a state flush with the end. The electromagnet 35 is electrically connected to the ECU 2. When energized by the control input Vcain (voltage signal) from the ECU 2, the electromagnet 35 attracts the arm opposed thereto by an electromagnetic force Fsol thereof against the urging force of the return spring 36 to thereby pivotally move the arm 34b toward the most advanced position stopper 33b.

Next, a description will be given of the operation of the electromagnetic variable cam phase mechanism 30 constructed as above. In the electromagnetic variable cam phase mechanism 30, when the electromagnet 35 of the electromagnetic brake 32 is not energized, the core 34 is held at the most retarded position where the arm 34b is brought into abutment with the most retarded position stopper 33a, by the urging force of the return spring 36, whereby the cam phase Cain is held at the most retarded value Cainrt (see FIG. 5).

In the above state, when the sprocket 4a rotates in a direction indicated by an arrow Y1 in FIG. 4, the planetary carrier 31d and the ring gear 31a rotate in unison with each other, whereby the planetary pinion gears 31b do not rotate but the sun gear 31c rotates in unison with the planetary carrier 31d and the ring gear 31a. That is, the sprocket 4a and the intake camshaft 4 rotate in unison with each other.

Further, in the state in which the core 34 is held at the most retarded position, when the electromagnet 35 is energized by the control input Vcain from the ECU 2, the arm 34b of the core 34 is attracted toward the most advanced position stopper 33b, i.e. toward the most advanced position by the electromagnetic force Fsol of the electromagnet 35 against the urging force of the return spring 36, whereby the arm 34b is pivotally moved to a position where the electromagnetic force Fsol and the urging force of the return spring 36 are balanced. In other words, the outer casing 33 is pivotally moved relative to the core 34 in a direction opposite to the direction indicated by the arrow Y1.

Thus, the ring gear 31a is pivotally moved relative to the planetary carrier 31d in a direction indicated by an arrow Y2 in FIG. 3, and the planetary pinion gears 31b are pivotally moved in a direction indicated by an arrow Y3 in FIG. 3 along with the pivotal motion of the ring gear 31a, whereby the sun gear 31c rotates in a direction indicated by an arrow Y4 in FIG. 3. As a result, the intake camshaft 4 is pivotally moved relative to the sprocket 4a in a direction of rotation of the sprocket 4a (i.e. in a direction opposite to the direction indicated by the arrow Y2 in FIG. 3), whereby the cam phase Cain is advanced.

In this case, the pivotal motion of the outer casing 33 is transmitted to the intake camshaft 4 via the ring gear 31a, the planetary pinion gears 31b, and the sun gear 31c, and therefore the intake camshaft 4 is pivotally moved with respect to the sprocket 4a through a pivot angle of the outer casing 33 amplified by the speed-increasing effect of the planetary gear device 31. More specifically, the advance amount of the cam phase Cain of the intake cam 5 is set such that it becomes equal to a value obtained by amplifying the pivot angle of the outer casing 33. This is to compensate for the limit of a distance over which the electromagnetic force Fsol of the electromagnet 35 can act, and thereby change the cam phase Cain over a larger range.

Figure 5:
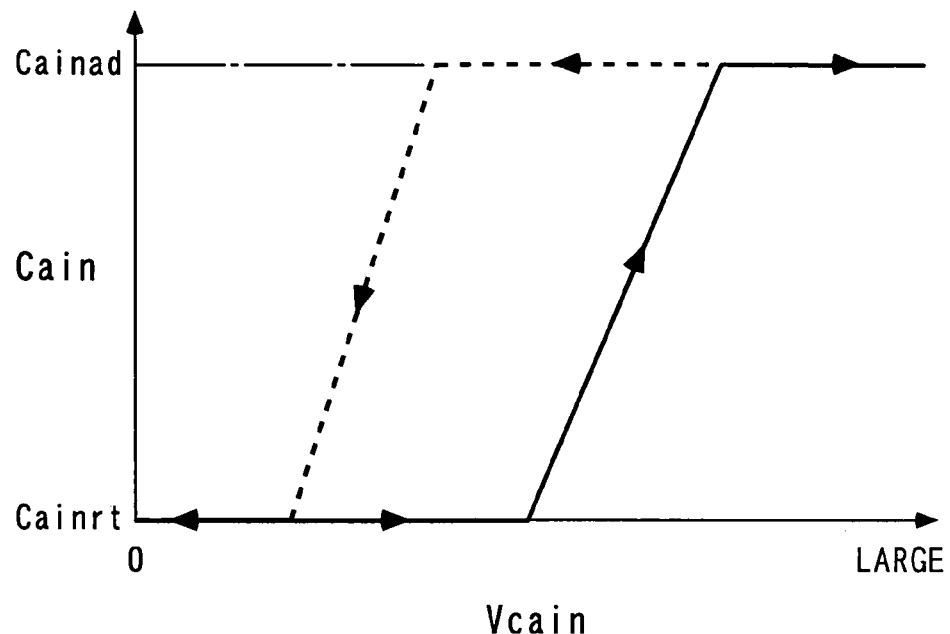
FIG. 5 A diagram of characteristic curves showing operating characteristics of the electromagnetic variable cam phase mechanism.

Next, a description will be given of operating characteristics of the electromagnetic variable cam phase mechanism 30 constructed as above. Referring to FIG. 5, in the electromagnetic variable cam phase mechanism 30, the cam phase Cain is continuously changed between the most retarded value Cainrt (one limit value defining the predetermined range; 0°) and the most advanced value Cainad (value defining the predetermined range; e.g. 55°) by the control input Vcain to the electromagnet 35, and a so-called hysteresis characteristic in which a curve in solid line indicative of values of the cam phase Cain obtained when the control input Vcain increases, and a curve in broken line indicative of values of the cam phase Cain obtained when the control input Vcain decreases are different from each other.

Figure 6:
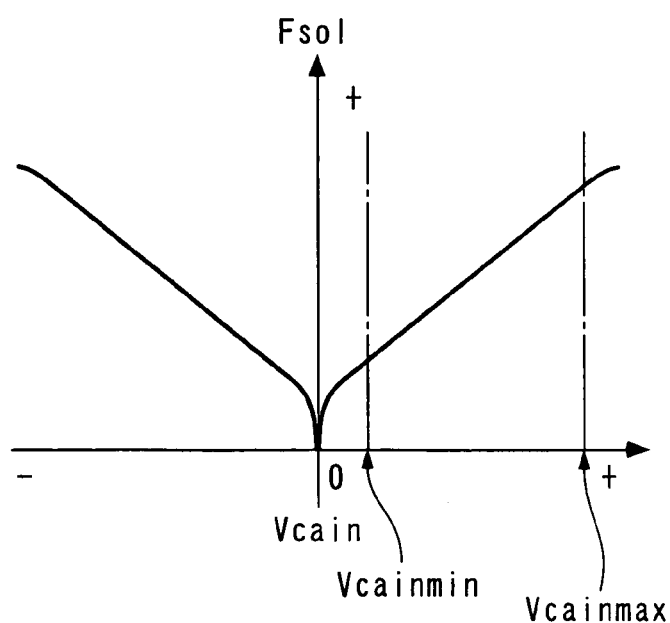
FIG. 6 A diagram of characteristic curves showing operating characteristics of an electromagnet of the electromagnetic variable cam phase mechanism.

This is because as shown in FIG. 6, when the electromagnet 35 is energized by the control input Vcain to generate the electromagnetic force Fsol, the electromagnetic force Fsol has a characteristic that it is slow in rising at the start. Further, as shown in FIG. 6, the electromagnetic force Fsol of the electromagnet 35 has a characteristic that when the control input Vcain increases from a value of 0 toward the positive side, it exhibits the same tendency as exhibited when the control input Vcain decreases from a value of 0 toward the negative side, that is, the electromagnetic force Fsol tends to be symmetric with respect to the value 0 of the control input Vcain as the center.

In the present embodiment, the electromagnetic variable cam phase mechanism 30 constructed as above is employed in place of the conventional hydraulically-driven variable cam phase mechanism for the following reason: The conventional hydraulically-driven variable cam phase mechanism has characteristics that it takes time before the cam phase Cain can be controlled after starting e.g. an oil pressure pump to cause oil pressure to rise, and the responsiveness of the mechanism is degraded when the oil temperature is very low, and hence has the drawback of having a long dead time and being low in responsiveness. In contrast, the electromagnetic variable cam phase mechanism 30 used in the present embodiment is advantageous in that the mechanism 30 need not wait for the oil pressure to rise and is prevented from being adversely affected by the oil temperature, and hence it is capable of not only properly controlling the cam phase Cain from the start but also shortening dead time and ensuring a higher responsiveness.

On the other hand, a cam angle sensor 20 is disposed at an end of the intake camshaft 4 opposite to the electromagnetic variable cam phase mechanism 30. The cam angle sensor 20 (output-detecting means, cam phase-detecting means) is comprised e.g. of a magnet rotor and an MRE pickup, and delivers a CAM signal, which is a pulse signal, to the ECU 2 along with rotation of the intake camshaft 4. Each pulse of the CAM signal is generated whenever the intake camshaft 4 rotates through a predetermined cam angle (e.g. 1°).

Further, an intake pipe absolute pressure sensor 21 and an injector 14 are arranged in an intake pipe 12 of the engine 3 at respective locations downstream of a throttle valve 13 provided in the intake pipe 12. The intake pipe absolute pressure sensor 21 is implemented e.g. by a semiconductor pressure sensor, and detects an intake pipe absolute pressure PBA within the intake pipe 12 to deliver a signal indicative of the sensed intake pipe absolute pressure to the ECU 2.

Furthermore, the injector 14 is controlled by a control signal from the ECU 2. More specifically, the injector 14 is caused to open according to a fuel injection amount Tout and fuel injection timing of the control signal to thereby inject fuel into the intake pipe 12.

Further, the engine 3 is provided with a crank angle sensor 22. The crank angle sensor 22 (output-detecting means, cam phase-detecting means) delivers a CRK signal and a TDC signal, which are both pulse signals, to the ECU 2 in accordance with rotation of the crankshaft 10.

Each pulse of the CRK signal is generated whenever the crankshaft 10 rotates through a predetermined angle (e.g. 30°). The ECU 2 calculates the rotational speed NE of the engine 3 (hereinafter referred to as "the engine speed NE") based on the CRK signal, and the cam phase Cain based on the CRK signal and the CAM signal delivered from the cam angle sensor 20. Further, the TDC signal indicates that each piston 11 in an associated cylinder is in a predetermined crank angle position slightly before the TDC position at the start of the intake stroke, and each pulse of the TDC signal is generated whenever the crankshaft 10 rotates through a predetermined crank angle.

On the other hand, a LAF sensor 23 is disposed in an exhaust pipe 15 at a location upstream of a catalytic device 16. The LAF sensor 23 is formed by combining an oxygen concentration sensor comprised of a zirconia layer and platinum electrodes, and a detection circuit, such as a linearizer, and linearly detects an air-fuel ratio in exhaust gases over a broad air-fuel ratio range from a rich region to a lean region, to deliver a signal indicative of the sensed air-fuel ratio Kact to the ECU 2. The ECU 2 carries out air-fuel ratio control based on the sensed air-fuel ratio Kact from the LAF sensor 23.

Furthermore, connected to the ECU 2 are an accelerator pedal opening sensor 24 and an ignition switch (hereinafter referred to as "the IG•SW") 25. The accelerator pedal opening sensor 24 detects an opening AP of an accelerator pedal, not shown, (hereinafter referred to as "the accelerator pedal opening AP") and delivers a signal indicative of the sensed accelerator pedal opening AP to the ECU 2. Further, the IG•SW 25 is turned on or off by operation of an ignition key (not shown) and delivers a signal indicative of the ON/OFF state thereof to the ECU 2.

The ECU 2 is implemented by a microcomputer including an I/O interface, a CPU, a RAM, and a ROM. The ECU 2 determines operating conditions of the engine 3, based on the detection signals delivered from the above-mentioned sensors 20 to 24, the ON/OFF signal from the IG•SW 25, and so forth, and executes a cam phase control process, as described hereinafter.

It should be noted that in the present embodiment, the ECU 2 implements the output-detecting means, target value-setting means, control value-calculating means, difference-calculating means, control input-calculating means, the cam phase-detecting means, and target cam phase-setting means.

Referring to FIG. 7, the control system 1 is comprised of a two-degree-of-freedom sliding mode controller (hereinafter referred to as "the TDFSLD controller") 40, and a DSM controller 50, both of which are implemented by the ECU 2.

The TDFSLD controller 40 (control input-calculating means) is provided for causing the cam phase Cain to converge to a target cam phase Cain_cmd (target value). More specifically, the TDFSLD controller 40 calculates a reference input r(k) with a two-degree-of-freedom sliding mode control algorithm expressed by equations (1) to (8) in FIG. 8, according to a cam phase Cain(k) and a target cam phase Cain_cmd(k). It should be noted that the reference input r(k) is calculated as a positive value for a reason described hereinafter.

In the equations in FIG. 8, a symbol (k) indicates that data therewith is discrete data sampled at a predetermined period. The symbol k indicates a position in the sequence of sampling cycles of respective discrete data. For example, the symbol k indicates that discrete data therewith is a value sampled in the current sampling timing, and a symbol k−1 indicates that discrete data therewith is a value sampled in the immediately preceding sampling timing. This also applies to discrete data (time-series data) mentioned hereinafter. It should be noted that in the following description, the symbol (k) and the like provided for the discrete data are omitted as deemed appropriate.

As expressed by the equation (1) in FIG. 8, in the above control algorithm, the reference input r(k) is calculated as the total sum of a feedforward input rff(k), a reaching law input rrch(k), an adaptive law input radp(k), and a damping input rdamp(k).

The feedforward input rff(k) is calculated by the equation (2) using a switching function-setting parameter POLE, and time-series data Cain_cmd_f(k), Cain_cmd_f(k−1), and Cain_cmd_f(k−2) of a filtered value of the target cam phase. The switching function-setting parameter POLE is set to a value which satisfies the relationship of −1<POLE<0.

The current value Cain_cmd_f(k) of the filtered value of the target cam phase is calculated by the equation (8) using the immediately preceding value Cain_cmd_f(k−1) thereof, the target cam phase Cain_cmd_(k), and a target value filter-setting parameter POLE_f. The target value filter-setting parameter POLE_f is set to a value which satisfies the relationship of −1<POLE_f<POLE<0.

Further, as expressed by the equation (3), the reaching law input rrch(k) is calculated as the product of a value of −1, a reaching law feedback gain Krch, and a switching function σs(k). The switching function σs(k) is calculated by the equation (6) using a follow-up error e(k) calculated by the equation (7), and the above-described switching function-setting parameter POLE.

Furthermore, as expressed by the equation (4), the adaptive law input radp(k) is calculated as the product of a value of −1, an adaptive law feedback gain Kadp, and an integral value Σσs of the switching function. Further, as expressed by the equation (5), the damping input rdamp(k) is calculated as the product of a value of −1, a damping feedback gain Kdamp, and the difference [Cain(k)−Cain(k−1)] between the current value and the immediately preceding value of the cam phase.

According to the above control algorithm for the TDF-SLD controller 40, the feedforward input rff(k) makes it possible to enhance the response of the control and a convergence rate at which the cam phase Cain converges to the target cam phase Cain_cmd. Further, the reaching law input rrch(k) and the adaptive law input radp(k) make it possible to specify the convergence rate at which the cam phase Cain converges to the target cam phase Cain_cmd, and the converging behavior with which the cam phase Cain is caused to converge to the target cam phase Cain_cmd. Moreover, the damping input rdamp(k) makes it possible to avoid oscillating behavior, such as overshooting caused by disturbance.

However, when the reference input r(k) calculated with the two-degree-of-freedom sliding mode control algorithm is inputted to the electromagnetic variable cam phase mechanism 30 as it is for controlling the same, there occurs the following problem: The target cam phase Cain_cmd is calculated assuming that the rate of change in the same is relatively high, and hence in the execution of follow-up control for causing the cam phase Cain to follow the target cam phase Cain_cmd, high follow-up performance (follow-up accuracy) is required. In contrast, as described hereinbefore, the operating characteristics of the electromagnetic variable cam phase mechanism 30 include the hysteresis characteristic, and therefore even if it is attempted to control the cam phase Cain within a range slightly more advanced than its most retarded value Cainrt, the cam phase Cain is changed to the most retarded value Cainrt, at a stroke, which makes it impossible to properly control the cam phase Cain. In short, it is difficult to control the cam phase Cain in the vicinity of the most retarded value Cainrt by a small amount of change. Similarly, even if it is attempted to control the cam phase Cain within a range slightly more retarded than its most advanced value Cainad, the cam phase Cain is changed to the most retarded value Cainrt, at a stroke, which makes it impossible to properly control the cam phase Cain. In short, it is difficult to control the cam phase Cain also in the vicinity of the most advanced value Cainad by a small amount of change.

For the above reason, a linear controller to which is applied a robust control algorithm including the sliding mode control algorithm, a PID control algorithm, or a like algorithm has difficulty accurately performing the follow-up control for causing the cam phase Cain to follow the target cam phase Cain_cmd high in the rate of change thereof.

Therefore, in the present embodiment, to accurately perform the follow-up control for causing the cam phase Cain to follow the target cam phase Cain_cmd, the reference input r(k) calculated with the above-described two-degree-of-freedom sliding mode control algorithm is modulated with a control algorithm based on a ΔΣ modulation algorithm, by the DSM controller 50, whereby a control input Vcain(k) to the electromagnetic variable cam phase mechanism 30 is calculated.

Figure 9:
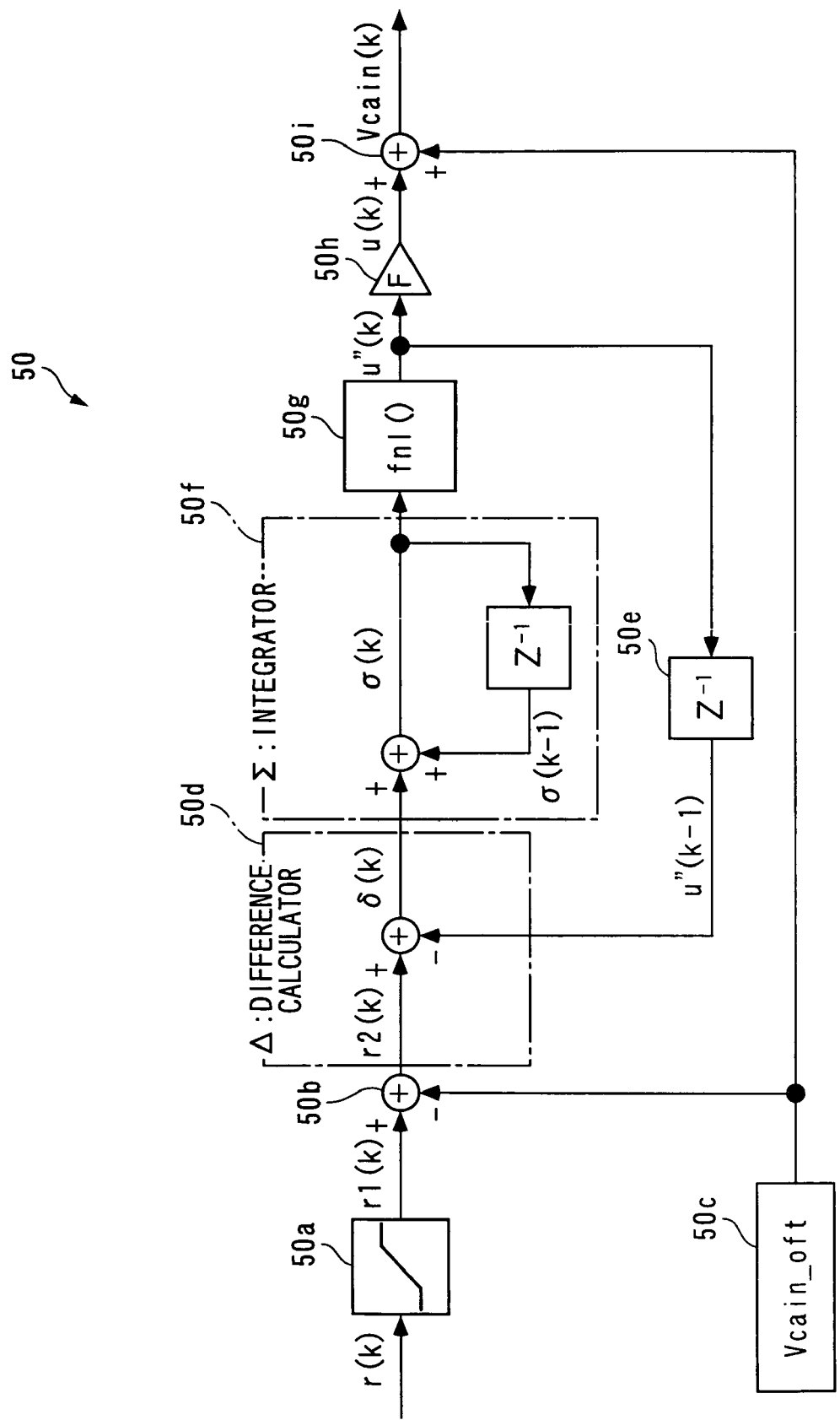
FIG. 9 A block diagram showing the configuration of a DSM controller.

Hereinafter, a description will be given of the DSM controller 50 (control value-calculating means, control input-calculating means). As shown in FIG. 9, in the DSM controller 50, when the reference input r(k) is inputted from the TDFSLD controller 40 to a limiter 50a, a limited value r1(k) obtained by subjecting the reference input r(k) to a limiting process is generated by the limiter 50a, and a limited value deviation r2(k) as a control value is generated by a difference calculator 50b (difference-calculating means) as the difference between the limited value r1(k) and a predetermined offset value Vcain_oft (first and second predetermined values) from an offset value-generating section 50c. Then, a difference signal value δ(k) is generated by a difference calculator 50d as the difference between the limited value deviation r2(k) and a modulation output u″(k−1) delayed by a delay element 50e.

Next, a difference integral value σ(k) is generated by an integrator 50f as a signal of the sum of the difference signal value δ(k) and a delayed value σ(k−1) of the difference integral value, and then a modulation output u″(k) as a modulation value is generated by a relay element 50g as a predetermined value +R/−R based on the difference integral value a (k). After that, a gain-adjusted value u(k) is generated by an amplifier 50h as a value obtained by subjecting the modulation output u″(k) to gain adjustment by a predetermined amplitude-adjusting gain F (=KDSM), and then the control input Vcain(k) is generated by an adder 50i as the sum of the gain-adjusted value u(k) and the predetermined offset value Vcain_oft from the aforementioned offset value-generating section 50c.

The control algorithm for the DSM controller 50 is expressed by equations (9) to (15) in FIG. 10. In the equation (9), Lim(r(k)) represents a limited value obtained by subjecting the reference input r(k) to a limiting process by the above-mentioned limiter 50a, and is calculated specifically as a value obtained by limiting the reference input r(k) within a range defined by a predetermined lower limit value rmin and a predetermined upper limit value rmax. More specifically, when r(k)<rmin, Lim(r(k))=rmin holds, when rmin≦r(k)≦rmax, Lim(r(k))=r(k) holds, and when r(k)>rmax, Lim(r(k))=rmax holds. The lower limit value rmin and the upper limit value rmax are both set to predetermined positive values for a reason described hereinafter.

Further, in the equation (13), fnl (σ(k)) represents a nonlinear function corresponding to the above-described relay element 50g. The value of fnl(σ(k)) is set such that when σ(k)≧0, fnl(σ(k))=R holds, and when σ(k)<0, fnl(σ(k))=−R holds (fnl(σ(k)) may be set such that when σ(k)=0, fnl(σ(k))=0 holds). Further, the value R is set to such a value larger than a value of 1 as always satisfies the relationship of R>|r2(k)|, for a reason described hereinafter. Further, KDSM in the equation (14) represents an amplitude-adjusting gain corresponding to the above amplitude-adjusting gain F, and is set to a value not larger than a value of 1, as described hereinafter.

The control algorithm for the DSM controller 50 used in the present embodiment is configured as above. In the following, the reason for this will be described with reference to a controller 60 of a comparative example shown in FIG. 11. The controller 60 is one to which is applied a control algorithm proposed by the present assignee in Japanese Patent Application No. 2002-231614. The controller 60 is different from the DSM controller 50 used in the present embodiment only in that a difference signal value δ(k) between a limited value r1'(k) of a reference input r(k) u" generated by a limiter 60a, and a delayed value u"(k−1) as a modulation output is generated by a difference calculator 60b, and that a quantizer 60e is used in place of the relay element 50g. The other component elements are configured similarly to those of the DSM controller 50, and hence detailed description thereof is omitted.

A control algorithm for the controller 60 is expressed by equations (16) to (21) in FIG. 12. In the equation (16), sat(r(k)) represents a saturation function. The value of sat(r(k)) is set such that when r(k)<−1, sat(r(k))=−1 holds, when −1≦r(k)≦1, sat(r(k))=r(k) holds, and when r(k)>1, sat(r(k))=1 holds.

Furthermore, in the equation (19), sgn(σ(k)) represents a sign function corresponding to the above-described quantizer 60e. The value of sgn(σ(k)) is set such that when σ(k)≧0, sgn(σ(k))=1 holds, and when σ(k)<0, sgn(σ(k))=−1 holds (sgn(σ(k)) may be set such that when σ(k)=0, sgn(σ(k))=0 holds)

When the controller 60 is employed, as shown in FIG. 13, when the absolute value of the reference input r is smaller than a value of 1, the modulation output u is frequently inverted between a value of 1 and a value of −1. However, as shown in FIG. 14, when the absolute value of the reference input r is not smaller than a value of 1, the limited value r1' is held at a value of 1 or a value of −1, whereby a time period over which the modulation output u" is held at a value of 1 or a value of −1 is made longer. This results in the loss of the switching behavior of the modulation output u", which characterizes the ΔΣ modulation algorithm. This problem occurs when the absolute value of the reference input r continues to be not smaller than a value of 1, while the absolute value of the modulation output u" that returns to the difference calculator 60b is equal to a value of 1.

Figure 15:
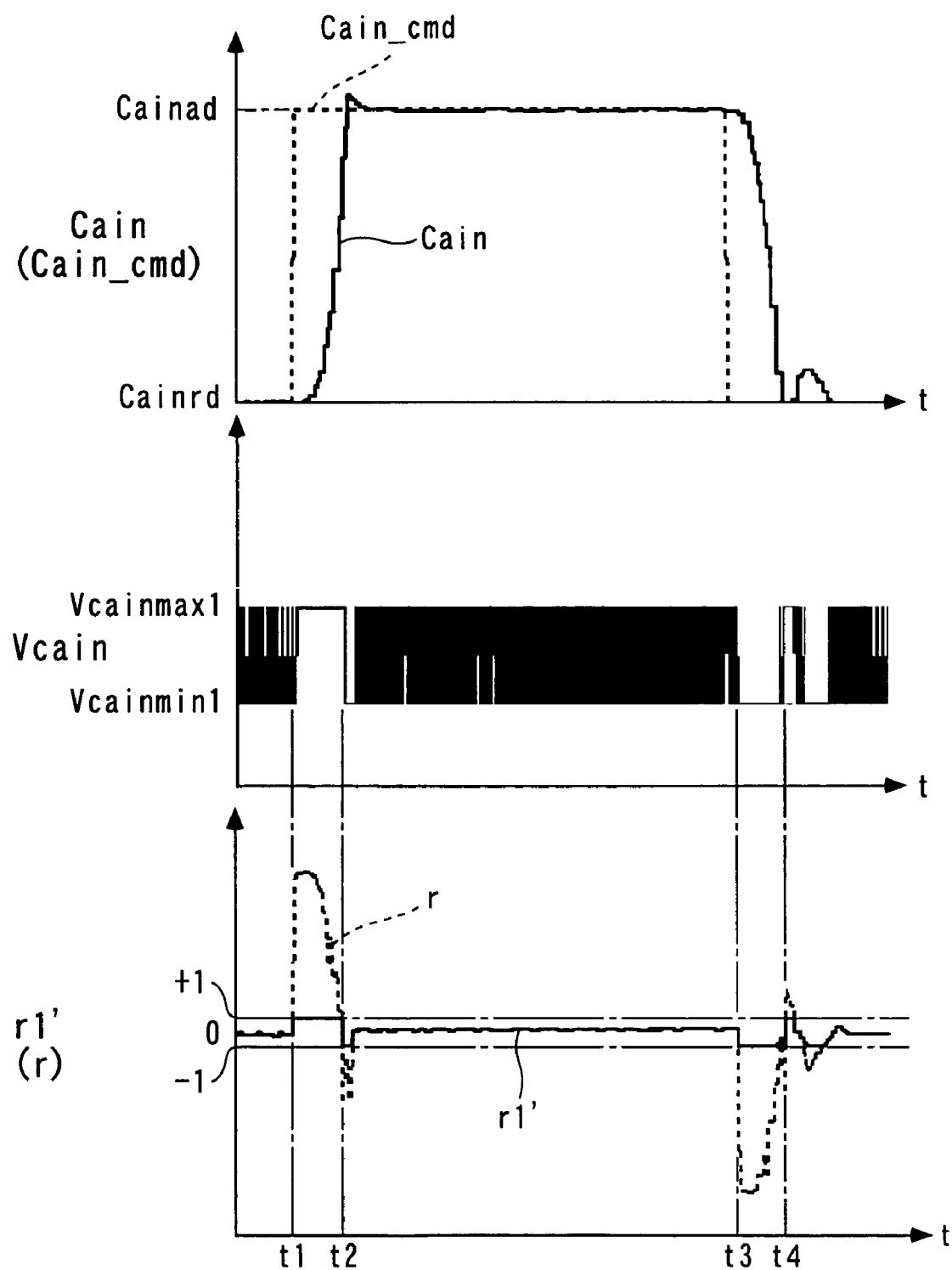
FIG. 15 A timing diagram showing an example of operation of the electromagnetic variable cam phase mechanism in the case where it is controlled by using the controller of the comparative example.

Referring to FIG. 15, in the reference input r calculated by the TDFSLD controller 40 used in the present embodiment for causing the cam phase Cain to follow the target cam phase Cain_cmd, the absolute value of the reference input r sometimes continues to be by far larger than a value of 1 due to the above-described FIG. 5 operating characteristics (particularly, gain characteristics) of the electromagnetic variable cam phase mechanism 30. Therefore, in the controller 60 of the comparative example, a state occurs in which the limited value r1' is held at a value of 1 or a value of −1 for a long time, whereby a state occurs in which the control input Vcain is held at a predetermined maximum value Vcainmax1 or a predetermined minimum value Vcainmin1 for a long time (between t1 and t2, between t3 and t4, etc.). As a result, the cam phase Cain overshoots the most advanced value Cainad or the most retarded value Cainrt, which causes the arms 34b of the core 34 to collide with the most retarded position stopper 33a or the most advanced position stopper 33b to produce impact noise or the like.

In contrast, in the DSM controller 50 used in the present embodiment, the above-described relay element 50g, that is, the nonlinear function fnl(σ(k)) is used in place of the quantizer 60e, that is, the sign function sgn(σ(k)), and the above-described predetermined value R is set to such a value as always satisfies the relationship of R>|r2|, so that the absolute value of the modulation output u" returned to the difference calculator 50d is always larger than the absolute value of the limited value deviation r2, whereby the switching behavior of the modulation output u" is properly maintained.

Further, the reason why in the DSM controller 50, the limited value deviation r2, which is the difference between the limited value r1 and the predetermined offset value Vcain_oft, is inputted to the difference calculator 50d, and the control input Vcain is calculated as the sum of the offset value Vcain_oft and the gain-adjusted value u is as follows:

As described hereinbefore, the electromagnet 35 of the electromagnetic variable cam phase mechanism 30 has a characteristic that the electromagnetic force Fsol thereof exhibits the same tendency when the control input Vcain increases from a value of 0 toward the positive side, and when the control input Vcain decreases from a value of 0 toward the negative side. Therefore, even when the control input Vcain assumes a positive value or a negative value, if the absolute values thereof are the same, the same electromagnetic force Fsol is generated. However, when the sign of the control input Vcain is inverted, magnetic fluxes in different directions interfere with each other, whereby a state occurs in which the electromagnetic force Fsol is cancelled out, resulting in the degraded power efficiency and controllability. To avoid the inconveniences, it is necessary to calculate the control input Vcain as only one of a positive value and a negative value, and therefore the TDFSLD controller 40 in the present embodiment calculates the reference input r such that it always assumes a positive value, and accordingly, the limited range of the limiter 50a is set to a predetermined range (rmin to rmax) on the positive value side.

However, when the limited value r1 is always calculated as a positive value as described above, if the limited value r1 is inputted to the difference calculator 50d as it is, as shown in FIG. 16, the modulation output u" is degraded in frequency of inversion between its maximum value R and its minimum value −R, and a time period over which the modulation output u" is held at the maximum value R becomes longer, which results in the degraded accuracy of control. To avoid this inconvenience, the DSM controller 50 in the present embodiment calculates the limited value deviation r2 to be input to the difference calculator 50d as the difference between the limited value r1 and the offset value Vcain_oft, and the upper and lower limit values rmax and rmin of the limiter 50a and the offset value Vcain_oft are set to appropriate values such that the limited value deviation r2 can assume both a positive value and a negative value. This causes, as shown in FIG. 17, the modulation output u" to be calculated as a value which is frequently inverted between the maximum value R and the minimum value −R and of which the inversion to the maximum value R and the inversion to the minimum value −R occur such that the ratio between the respective frequencies thereof becomes closer to half and half. As a result, it is possible to enhance the accuracy of the control.

Furthermore, to avoid the above-described inversion of the sign of the control input Vcain, the offset value Vcain_oft and the amplitude-adjusting gain KDSM are set to appropriate values (KDSM≦1) which enables the control input Vcain to repeatedly invert between the predetermined maximum value Vcainmax (see FIG. 6) and the predetermined minimum value Vcainmin (see FIG. 6), both of which are positive values. It should be noted that the minimum value Vcainmin is set to such a value outside a region where the rise of the electromagnetic force Fsol at the start is slow.

Figure 18:
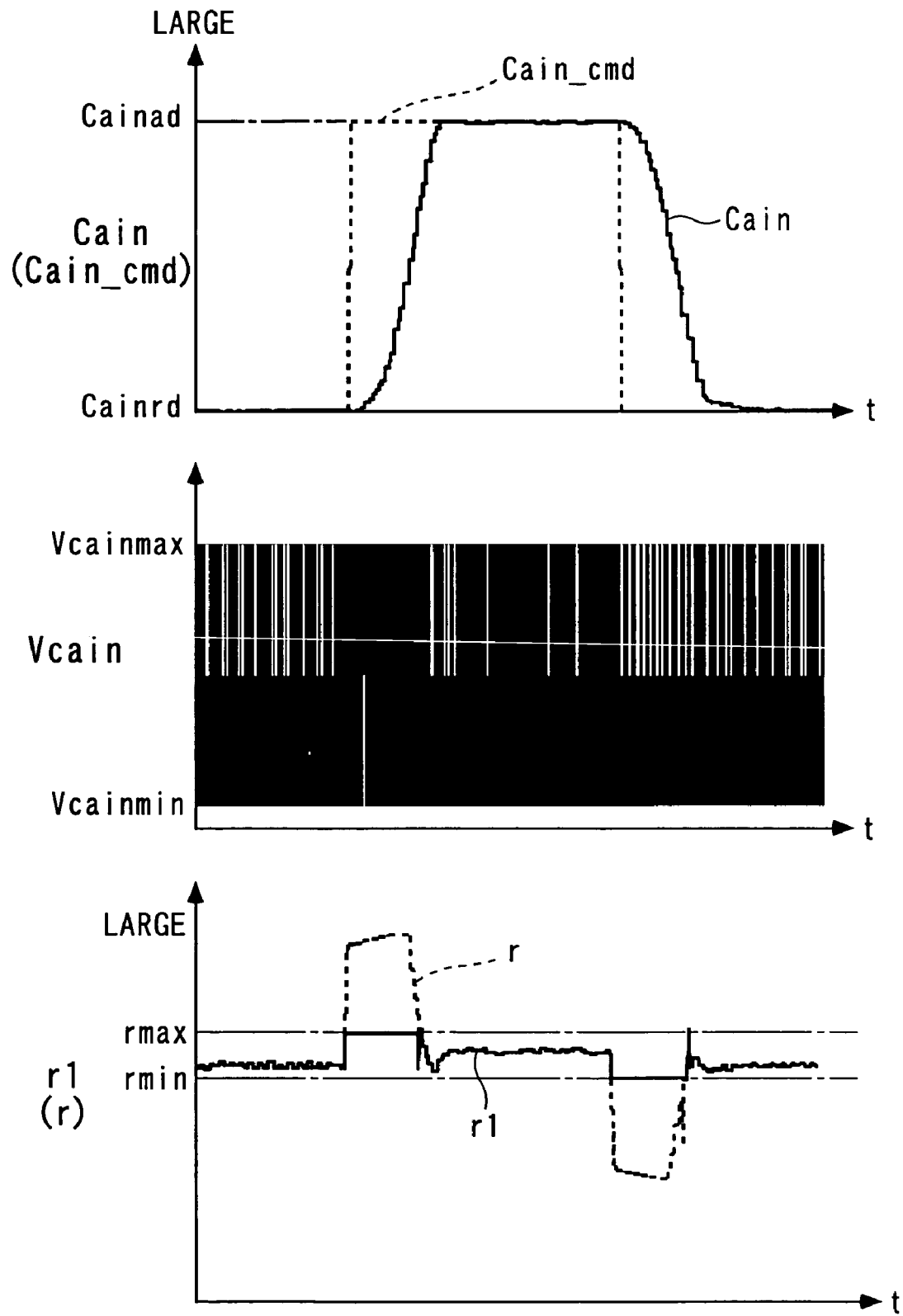
FIG. 18 A timing diagram showing an example of operation of the electromagnetic variable cam phase mechanism in the case where it is controlled by the control system according to the first embodiment.

In the DSM controller 50, the control input Vcain is calculated with the above described control algorithm based on the reference input r from the TDFSLD controller 40, and inputted to the electromagnetic variable cam phase mechanism 30, whereby the cam phase Cain is controlled. As a result, as shown in FIG. 18, even when the reference input r is suddenly increased or decreased, the limited value r1 thereof is set such that rmin≦r1≦rmax holds, whereby the control input Vcain is set to a value which is frequently inverted between the maximum value Vcainmax and the minimum value Vcainmin and of which the inversion to the maximum value and the inversion to the minimum value occur such that the ratio between the respective frequencies thereof becomes closer to half and half. This enables the cam phase Cain to be controlled with more accuracy than by using the controller 60 of the comparative example, whereby as shown in 18, the cam phase Cain is prevented from overshooting the most advanced value Cainad or the most retarded value Cainrt. This makes it possible to prevent the arms 34b of the core 34 from colliding with the most retarded position stopper 33a or the most advanced position stopper 33b to avoid generation of impact noise.

Figure 19:
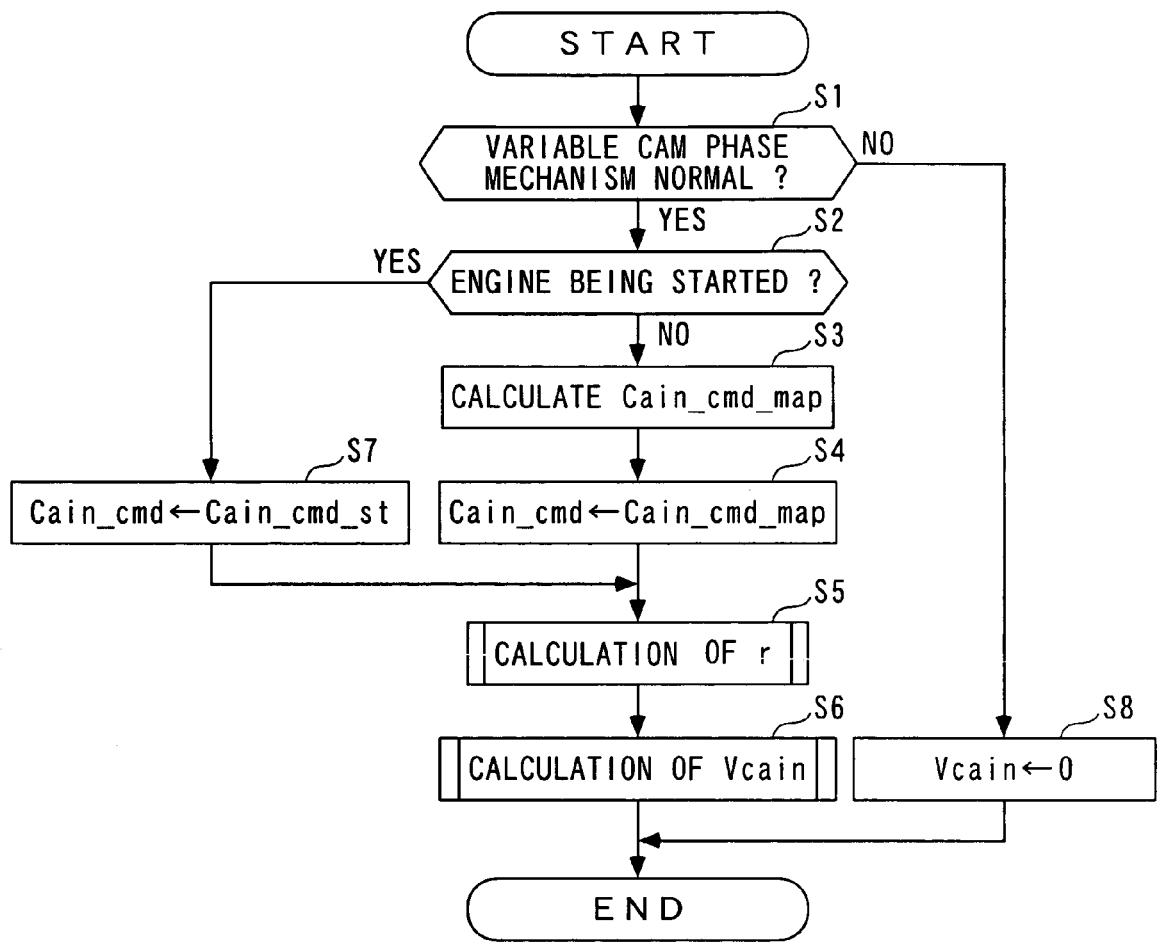
FIG. 19 A flowchart showing a cam phase control process.

Hereafter, the cam phase control process carried out by the ECU 2 will be described with reference to FIG. 19. As shown in FIG. 19, in this process, first, in a step 1 (shown as S1 in abbreviated form in FIG. 19; the following steps are also shown in abbreviated form), it is determined whether or not the electromagnetic variable cam phase mechanism 30 is normal. If the answer to this question is affirmative (YES), i.e. if the electromagnetic variable cam phase mechanism 30 is normal, the process proceeds to a step 2, wherein it is determined whether or not the engine 3 is being started. The determination is performed based on the ON/OFF signal from the IG•SW 25 and the engine speed NE.

Figure 20:
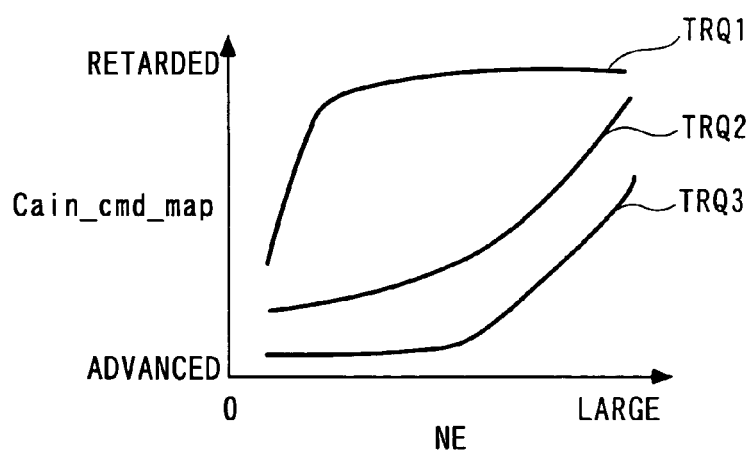
FIG. 20 A diagram showing an example of a map for use in the calculation of a map value Cain_cmd_map of a target cam phase.

If the answer to the question of the step 2 is negative (NO), i.e. if the engine 3 has been started, the process proceeds to a step 3, wherein a map value Cain_cmd_map of the target cam phase is calculated by searching a map shown in FIG. 20 according to the engine speed NE and demanded torque TRQ. It should be noted that the demanded torque TRQ is calculated based on the engine speed NE and the accelerator pedal opening AP.

In FIG. 20, predetermined values TRQ1 to TRQ3 of the demanded torque TRQ are set to values between which the relationship of TRQ1>TRQ2>TRQ3 holds. In this map, the map value Cain_cmd_map of the target cam phase is set to a more advanced value as the engine speed NE is lower, or as the demanded torque TRQ is smaller. This is to set a larger valve overlap between the intake valve 6 and the exhaust valve 9 as the engine speed NE is lower, or the load on the engine 3 is smaller, to increase the internal EGR amount to thereby reduce the pumping loss.

Then, the process proceeds to a step 4, wherein the map value Cain_cmd_map calculated in the step 3 is set to the target cam phase Cain_cmd. After that, the process proceeds to a step 5, wherein the reference input r is calculated with the control algorithm expressed by the aforementioned equations (1) to (8).

Then, the process proceeds to a step 6, wherein the control input Vcain is calculated with the control algorithm expressed by the aforementioned equations (9) to (15), followed by terminating the present process.

On the other hand, if the answer to the question of the step 2 is affirmative (YES), i.e. if the engine 3 is being started, the process proceeds to a step 7, wherein the target cam phase Cain_cmd is set to a predetermined start-time value Cain_cmd_st. Then, the above steps 5 and 6 are executed, followed by terminating the present process.

On the other hand, if the answer to the question of the step 1 is negative (NO), i.e. if the electromagnetic variable cam phase mechanism 30 is faulty, the process proceeds to a step 8, wherein the control input Vcain is set to a value of 0, followed by terminating the present process. This controls the cam phase Cain to the most retarded value Cainrt.

As described above, according to the control system 1 of the present embodiment, the reference input r is calculated as a positive value by the TDFSLD controller 40 so as to avoid inversion of the directions of the magnetic fluxes in the electromagnet 35 of the electromagnetic variable cam phase mechanism 30. Then, the limited value r1 of the reference input r is calculated as a positive value by the DSM controller 50, and the limited value deviation r2, which is the difference between the limited value r1 and the offset value Vcain_oft, is modulated with the algorithm [equations (11) to (13)] based on the ΔΣ modulation algorithm, whereby the modulation output u is calculated as the predetermined value +R/−R. Then, the offset value Vcain_oft is added to the gain-adjusted value u obtained by subjecting the modulation output u" to gain adjustment, whereby the control input to the electromagnetic variable cam phase mechanism 30 is calculated.

As described hereinabove, although the limited value r1 is calculated as a positive value, the limited value deviation r2, which is the difference between the limited value r1 and the offset value Vcain_oft, is modulated with the algorithm [equations (11) to (13)] based on the ΔΣ modulation algorithm, whereby the modulation output u" is calculated, and hence by setting the offset value Vcain_oft properly, the modulation output u" can be calculated as a value which is frequently inverted between the maximum value R and the minimum value −R and of which the inversion to the maximum value R and the inversion to the minimum value −R occur such that the ratio between the respective frequencies thereof becomes closer to half and half, thereby making it possible to enhance the accuracy of the control. Further, the absolute value of the modulation output u", i.e. the predetermined value R is set to such a value larger than a value of 1 as satisfies the relationship of R>|r2|. Therefore, by properly setting the predetermined value R, the upper and lower limit values rmax and rmin for the limiting process, and the offset value Vcain_oft, even when the reference input r is held at a considerably larger value than a value of 1 for a long time, it is possible to calculate the limited value deviation r2 as a value whose sign is frequently inverted, thereby making it possible to avoid the difference signal value δ from being held at the same value for a long time. As a result, it is possible to calculate the modulation output u" as a value which is frequently inverted between the maximum value R and the minimum value −R and of which the inversion to the maximum value R and the inversion to the minimum value −R occur such that the ratio between the respective frequencies thereof becomes closer to half and half. This makes it possible to enhance the accuracy of the control.

Further, the control input Vcain is calculated by adding the offset value Vcain_oft to the gain-adjusted value u obtained by subjecting modulation output u" to gain adjustment, and hence the addition of the offset value Vcain_oft makes it possible to calculate the control input Vcain as a value that varies only within a range between the predetermined positive minimum value Vcainmin and the predetermined positive maximum value Vcainmax, thereby making it possible to avoid the above-described inversion of the direction of the magnetic flux. Moreover, the minimum value Vcainmin is set to a value outside the region where the rise of the electromagnetic force Fsol at the start is slow. From the above, it is possible to enhance both the power efficiency and the controllability.

Furthermore, the electromagnetic variable cam phase mechanism 30 is employed as a mechanism for changing the cam phase Cain, so that differently from the case of the hydraulically-driven variable cam phase mechanism being employed, it is possible not only to properly control the cam phase Cain from the start without waiting for the rise of oil pressure but also to prevent the mechanism 30 from being adversely affected by oil temperature. In short, compared with the hydraulically-driven variable cam phase mechanism, it is possible not only to shorten a dead time but also to ensure higher responsiveness. As a result, it is possible to further enhance the accuracy of the control.

It should be noted that although the first embodiment is an example in which the nonlinear function fnl, i.e. the relay element 50g is used so as to calculate the delayed value u"(k−1) of the modulation output, which is returned to the difference calculator 50d, that is, the modulation output u" such that the absolute value thereof becomes larger than the limited value deviation r2 (i.e. such that |u"|=R>|r2| holds), the configuration for calculating the modulation output u" is not necessarily limited thereto, but it may be any suitable configuration which enables calculation of the modulation output u" as such a value as described above. For example, the modulation output u" may be calculated as such a value as described above by employing a combination of a sign function sgn and a multiplication gain, i.e. a quantizer and an amplifier in place of the nonlinear function fnl, i.e. the relay element 50g.

Further, when the absolute value of the reference input r calculated by the TDFSLD controller 40 is not larger than a value of 1, the quantizer (i.e. the sign function sgn) may be used in place of the relay element 50g (i.e. the nonlinear function fnl) of the DSM controller 50. Furthermore, when the target cam phase Cain_cmd and the reference input r are both calculated as negative values, the offset value Vcain_oft may be set as a negative value whereby the control input Vcain may be changed only within a predetermined range on a negative value side.

Moreover, although the first embodiment is an example in which the electromagnetic variable cam phase mechanism 30 is used for changing the cam phase Cain of the intake cam 5, it may be used for changing a cam phase of the exhaust cam 8 with respect to the crankshaft 10. Further, the control algorithm for controlling the cam phase Cain to the target cam phase Cain_cmd is not necessarily limited to the two-degree-of-freedom sliding mode control algorithm used in the first embodiment, but it may be any suitable control algorithm which is capable of controlling the cam phase Cain to the target cam phase Cain_cmd. For example, a response-specifying control algorithm, such as a PID control algorithm or a back-stepping control algorithm, may be used.

Figure 21:
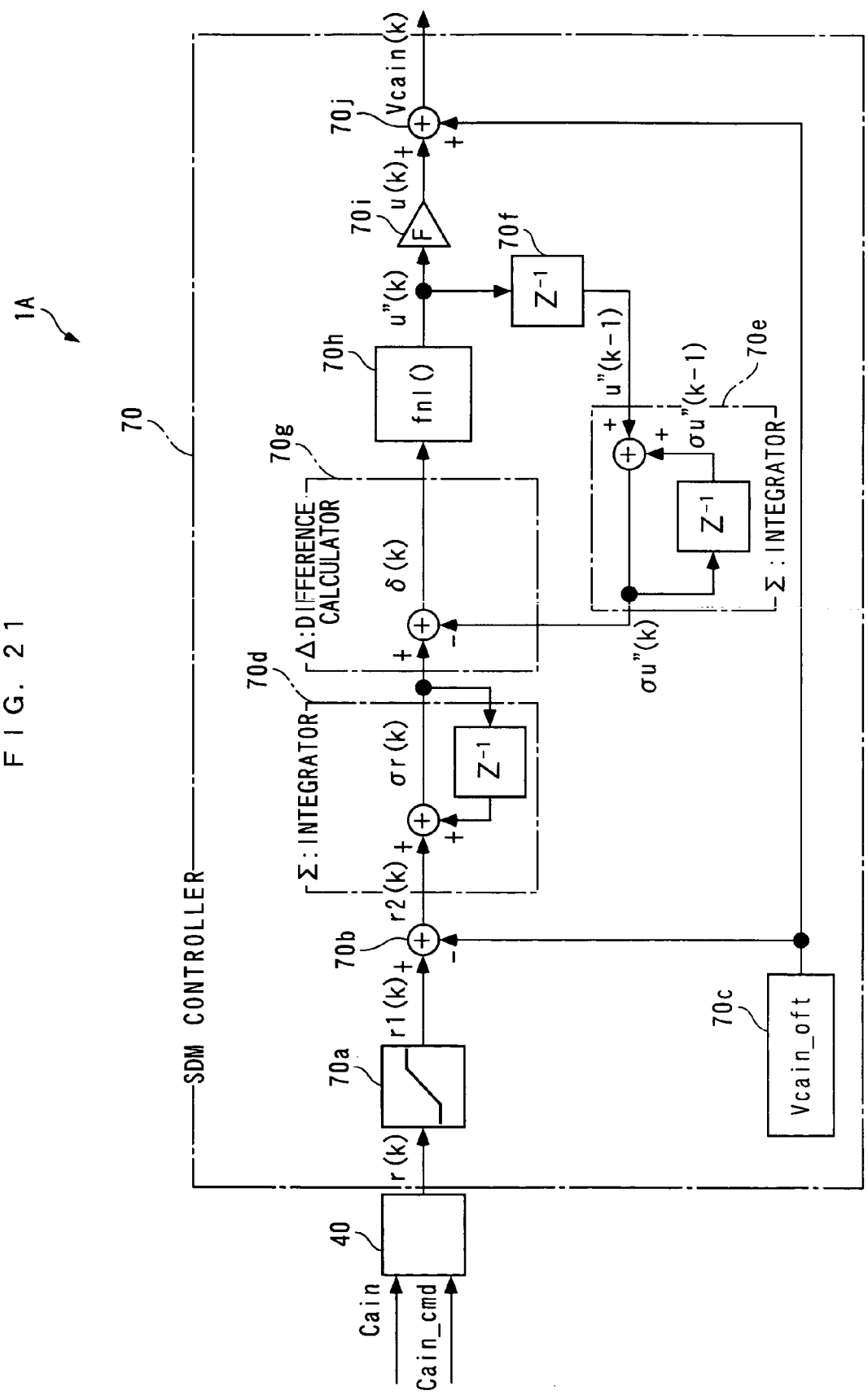
FIG. 21 A diagram showing the configuration of a control system according to a second embodiment of the present invention.

Next, a control system according to a second embodiment will be described with reference to FIG. 21. As shown in FIG. 21, the control system 1A according to the second embodiment is different from the control system 1 according to the first embodiment only in that an SDM controller 70 is used in place of the DSM controller 50, and the other component elements are configured similarly to those of the control system 1 according to the first embodiment, so that detailed description thereof is omitted. The SDM controller 70 (control value-calculating means, control input-calculating means) is provided for calculating a control input Vcain(k), based on a reference input r(k) from the TDFSLD controller 40, with a control algorithm to which is applied a ΣΔ modulation algorithm.

More specifically, in the SDM controller 70, when the reference input r(k) from the TDFSLD controller 40 is inputted to a limiter 70a (control value-calculating means), a limited value r1(k) is generated by the limiter 7a, and then a limited value deviation r2(k) is generated by a difference calculator 70b (difference-calculating means) as the difference between the limited value r1(k) and a predetermined offset value Vcain_oft from an offset value-generating section 70c. Then, a difference integral value σr(k) as an integral value of a control value is generated by a difference calculator 70d as the sum of the limited value deviation r2(k) and a delayed value σr(k−1) of the difference integral value. On the other hand, a modulation output integral value σu" (k) as an integral value of a modulation value is generated by an integrator 70e as the sum of a modulation output u" (k−1) delayed by a delay element 70f and a delayed value σu" (k−1) of the modulation output integral value. Then, a difference signal value δ(k) is generated by a difference calculator 70g as the difference between the difference integral value σr(k) and the modulation output integral value σu" (k)

Then, a modulation output u" (k) is generated by a relay element 70h as a predetermined value +R/−R based on the difference signal value δ(k). Then, a gain-adjusted value u(k) is generated by an amplifier 70i as a value obtained by subjecting the modulation output u" (k) to gain adjustment by a predetermined amplitude-adjusting gain F (=KDSM), and then the control input Vcain(k) is generated by an adder 70i as the sum of the gain-adjusted value u(k) and the above-described offset value Vcain_oft.

The control algorithm for the SDM controller 70 is expressed by equations (22) to (29) shown in FIG. 22. A limit range of a limited value Lim(r(k)) is set to the same value as that used in the aforementioned equation (9).

Furthermore, a nonlinear function $fnl(\delta(k))$ in the equation (27) is set such that when $\delta(k) \geqq 0$, $fnl(\delta(k))=R$ holds, and when $\delta(k)<0$, $fnl((k))=-R$ holds (it should be noted that the nonlinear function $fnl(\delta(k))$ may be set such that when $\delta(k)=0$, $fnl(\delta(k))=0$ holds)

Moreover, for the above-described reason, the predetermined value R is set to such a value larger than a value of 1 as always satisfies the relationship of $R>|r2(k)|$. Further, an offset value Vcain_oft in the equation (23) and an amplitude-adjusting gain KDSM in the equation (28) are set to respective appropriate values which are capable of avoiding the inversion of the sign of the control input Vcain (KDSM≦1), as described above.

According to the SDM controller 70 configured as above, similarly to the aforementioned DSM controller 50, it is possible to calculate the control input Vcain(k) as a value which is frequently inverted between a predetermined positive maximum value Vcainmax and a predetermined positive minimum value Vcainmin and of which the inversion to the maximum value Vcainmax and the inversion to the minimum value Vcainmin occur such that the ratio between the respective frequencies thereof becomes closer to half and half. As a result, also in the control system 1A according to the present embodiment, it is possible to obtain the same advantageous effects as provided by the control system 1 according to the first embodiment.

Next, a control system 1B according to a third embodiment will be described with reference to FIG. 23. The control system 1B according to the third embodiment is distinguished from the control system 1 according to the first embodiment only in that a DM controller 80 is used in place of the DSM controller 50, and the other parts are configured similarly to those of the control system 1 according to the first embodiment, so that detailed description thereof is omitted. The DM controller 80 (control value-calculating means, control input-calculating means) calculates a control input Vcain(k), based on a reference input r(k) from the TDFSLD controller 40, with a control algorithm to which is applied a Δ modulation algorithm.

Figure 23:
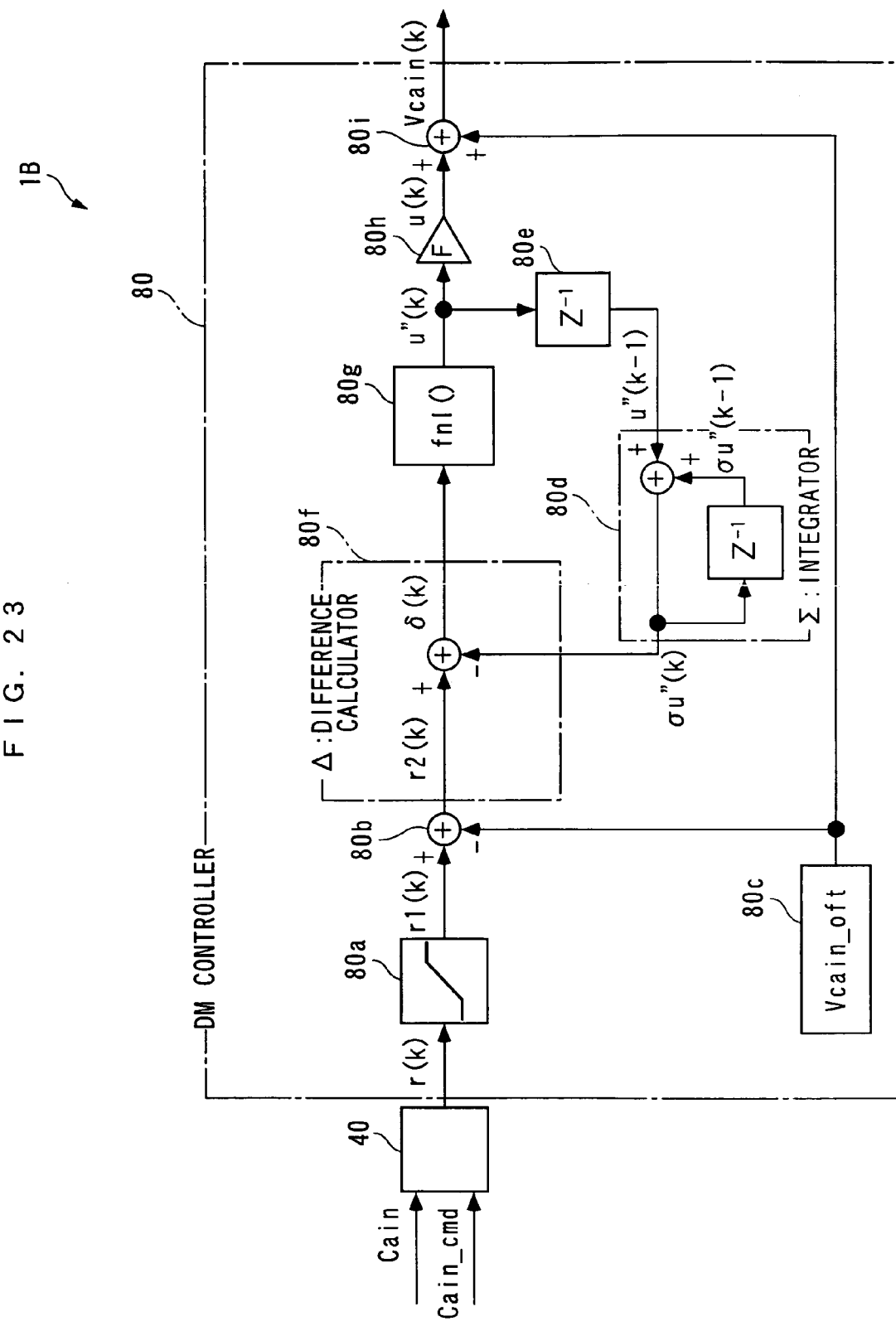
FIG. 23 A diagram showing the configuration of a control system according to a third embodiment of the present invention.

More specifically, as shown in FIG. 23, in the DM controller 80, when the reference input r(k) is inputted from the TDFSLD controller 40 to a limiter 80a (control value-calculating means), a limited value r1(k) is generated by the limiter 80a, and then a limited value deviation r2(k) is generated by a difference calculator 80b (difference-calculating means) as the difference between the limited value r1(k) and a predetermined offset value Vcain_oft from an offset value-generating section 80c. On the other hand, a modulation output integral value $\sigma u''(k)$ is generated by a difference calculator 80d as the sum of a modulation output $u''(k-1)$ delayed by a delay element 80e and a delayed value $\sigma u''(k-1)$ of the modulation output integral value. Then, a difference signal value $\delta(k)$ is generated by a difference calculator 80f as the difference between the limited value deviation r2(k) and the modulation output integral value $\sigma u''(k)$.

Then, a modulation output u"(k) is generated by a relay element 80g as a predetermined value +R/−R based on the difference signal value δ(k). After that, a gain-adjusted value u(k) is generated by an amplifier 80h as a value obtained by subjecting the modulation output u"(k) to gain adjustment by a predetermined amplitude-adjusting gain F (=KDSM), and then the control input Vcain(k) is generated by an adder 80i as the sum of the gain-adjusted value u(k) and the above-described offset value Vcain_oft.

The control algorithm for the DM controller 80 is expressed by equations (30) to (36) in FIG. 24. A limited value Lim(r(k)) in the equation (30) is set to the same limit range as that of the limited value Lim(r(k)) in the aforementioned equation (22). Further, a nonlinear function fnl (δ(k)) in the equation (34) is also set to the same value as that of the nonlinear function fnl(δ(k)) in the aforementioned equation 27. More specifically, the nonlinear function fnl(δ(k)) is set such that when $\delta(k) \geqq 0$, $fnl(\delta(k))=R$ holds, and when $\delta(k)<0$, $fnl(\delta(k))=-R$ holds (it should be noted that the nonlinear function $fnl(\delta(k))$ may be set such that when $\delta(k)=0$, $fnl(\delta(k))=0$ holds).

Moreover, for the above-described reason, the predetermined value R is set to such a value larger than a value of 1 as always satisfies the relationship of $R>|r2(k)|$. Further, an offset value Vcain_oft in the equation (31) and an amplitude-adjusting gain KDSM in the equation (35) are also set to respective appropriate values which make it possible to avoid the inversion of the sign of the control input Vcain (KDSM≦1), as described above.

According to the SDM controller 80 configured as above, similarly to the above-described DSM controller 50, it is possible to calculate the control input Vcain(k) as a value which is frequently inverted between a predetermined positive maximum value Vcainmax and a predetermined positive minimum value Vcainmin and of which the inversion to the maximum value Vcainmax and the inversion to the minimum value Vcainmin occur such that the ratio between the respective frequencies thereof becomes closer to half and half. As a result, also in the control system 1B according to the present embodiment, it is possible to obtain the same advantageous effects as provided by the control system 1 according to the first embodiment.

Figure 25:
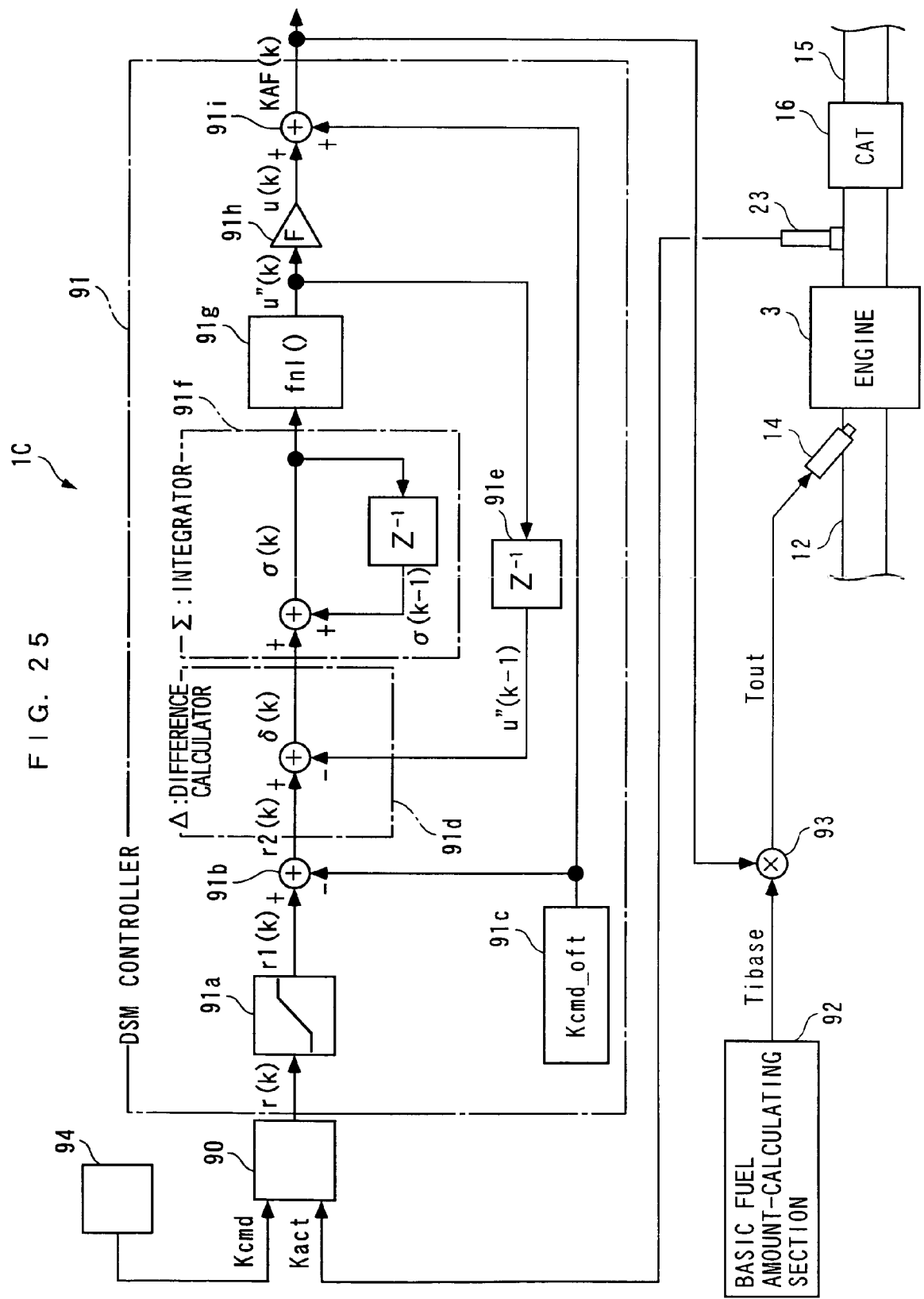
FIG. 25 A diagram showing the configuration of a control system according to a fourth embodiment of the present invention.

Next, a control system according to a fourth embodiment will be described with reference to FIG. 25. As shown in FIG. 25, the control system 1C according to the fourth embodiment controls the air-fuel ratio of a mixture supplied to the engine 3, and an object controlled by the control system corresponds to a system which outputs a detected air-fuel ratio Kact (output of the controlled object) in response to a fuel correction value KAF (control input), described hereinafter. The control system 1C is comprised of a two-degree-of-freedom sliding mode controller 90, a DSM controller 91, a basic fuel amount-calculating section 92, a multiplier 93, and a target air-fuel ratio-calculating section 94.

The target air-fuel ratio-calculating section 94 (target value-setting means) calculates a target air-fuel ratio Kcmd (value in terms of an equivalent ratio) e.g. by searching a map according to the engine speed NE and the intake pipe absolute pressure PBA.

Further, the two-degree-of-freedom sliding mode controller 90 (control value-calculating means) calculates a reference input r(k), based on the target air-fuel ratio Kcmd calculated by the target air-fuel ratio-calculating section 94, and the detected air-fuel ratio Kact (value in terms of an equivalent ratio) from the LAF sensor 23 as output-detecting means, with a two-degree-of-freedom sliding mode control algorithm. The control algorithm for the two-degree-of-freedom sliding mode controller 90 is configured similarly to the control algorithm for the above-described TDFSLD controller 40.

Then, the DSM controller 91 (control value-calculating means, control input-calculating means) calculates a fuel correction value KAF(k) as a control input based on the reference input r(k) from the two-degree-of-freedom sliding mode controller 90, with a control algorithm based on a ΔΣ modulation algorithm. The fuel correction value KAF(k) is calculated as a value in terms of an equivalent ratio.

The control algorithm for the DSM controller 91 is configured similarly to the control algorithm for the aforementioned DSM controller 50. More specifically, as shown in FIG. 25, in the DSM controller 91, when the reference input r(k) is inputted from the two-degree-of-freedom sliding mode controller 90 to a limiter 91a, a limited value r1(k) is generated by subjecting the reference input r(k) to a limiting process by the limiter 91a (control value-calculating means), and a limited value deviation r2(k) is generated by a difference calculator 91b (difference-calculating means) as the difference between the limited value r1(k) and a predetermined offset value Kcmd_oft from an offset value-generating section 91c. Then, a difference signal value δ(k) is generated by a difference calculator 91d as the difference between the limited value deviation r2(k) and a modulation output u″ (k−1) delayed by a delay element 91e.

Subsequently, a difference integral value σ(k) is generated by a difference calculator 91f as a signal of the sum of the difference signal value δ(k) and a delayed value σ(k−1) of the difference integral value, and then a modulation output u″ (k) is generated by a relay element 91g as a predetermined value +R1/−R1 based on the difference integral value σ(k). For the above-described reason, the predetermined value R1 is set to such a value larger than a value of 1 as always satisfies the relationship of R>|r2(k)|. After that, a gain-adjusted value u(k) is generated by an amplifier 91h as a value obtained by subjecting the modulation output u″ (k) to gain adjustment by a predetermined amplitude-adjusting gain F, and then the fuel correction value KAF(k) is generated by an adder 91i as the sum of the gain-adjusted value u(k) and the predetermined offset value Kcmd_oft from the offset value-generating section 91c.

In the above-mentioned control algorithm, the offset value Kcmd_oft (first and second predetermined values) and the amplitude-adjusting gain F are set to respective appropriate values which make it possible to avoid the inversion of the sign of the control input KAF, for the above-described reason.

On the other hand, the basic fuel amount-calculating section 92 calculates a basic fuel amount Tibase by searching a map, not shown, according to the engine speed Ne and the intake pipe absolute pressure PBA. Then, the multiplier 93 calculates a fuel injection amount Tout as a value obtained by multiplying the basic fuel amount Tibase by the fuel correction value KAF(k), and a control signal indicative of the fuel injection amount Tout is supplied to the injector 14, whereby a valve-opening time period of the injector 14 is controlled to control the air-fuel ratio.

According to the control system 1C of the fourth embodiment, the target air-fuel ratio Kcmd is set to a value in a broad range from a lean region to a rich region (e.g. an equivalent ratio range of 0.7 to 1.2), and therefore even when the detected air-fuel ratio Kact varies between a value in the lean region and a value in the rich region, by properly setting the predetermined offset value Kcmd_oft, the amplitude-adjusting gain F, and the predetermined value R1, it is possible to calculate the fuel correction value KAF(k) as a value that is capable of varying within a predetermined range while coping with changes in the above target air-fuel ratio Kcmd, and causing the detected air-fuel ratio Kact to accurately converge to the target air-fuel ratio Kcmd. In short, the air-fuel ratio control can be carried out with accuracy even when the engine 3 is in lean-burn operation.

It should be noted that although in the above-described embodiments, the control system according to the present invention is applied to a control system for control of the cam phase Cain or the air-fuel ratio of a mixture supplied to the engine 3, this is not limitative, but it is to be understood that the control system according to the present invention can be widely applied to control systems for control of other desired controlled objects. Further, the controllers 40, 50, 70, 80, 90, and 91 may be formed by electric circuits in place of the programs used in the above-described embodiments.

INDUSTRIAL APPLICABILITY

As described hereinbefore, the control system according to the present invention is useful as a control system which can be applied to control of a desired controlled object, such as a cam phase or the air-fuel ratio of a mixture supplied to the engine, and is capable of enhancing, in controlling the output of the controlled object with a control algorithm to which is applied a modulation algorithm, the accuracy of the control even when a value input to the control algorithm assumes only one of a positive value and a negative value or when the absolute value of the input value continues to be larger than a value of 1 for a long time.

The invention claimed is:

1. A control system for controlling an output of a controlled object by a control input to the controlled object, comprising:
    control value-calculating means for calculating a control value for control of the output of the controlled object with a predetermined control algorithm; and
    control input-calculating means for calculating a modulation value by modulating the calculated control value, with a predetermined modulation algorithm based on a $\Delta\Sigma$ modulation algorithm, and calculating the control input to the controlled object based on the calculated modulation value,
    wherein said control input-calculating means includes difference calculation for calculating a difference between the control value and the modulation value, in the predetermined modulation algorithm, and calculates the modulation value such that an absolute value thereof becomes equal to a predetermined value larger than a value of 1.

2. A control system for controlling an output of a controlled object by a control input to the controlled object, comprising:
    control value-calculating means for calculating a control value for control of the output of the controlled object with a predetermined control algorithm; and
    control input-calculating means for calculating a modulation value by modulating the calculated control value with a predetermined modulation algorithm based on a $\Sigma\Delta$ modulation algorithm, and calculating the control input to the controlled object based on the calculated modulation value,
    wherein said control input-calculating means includes first integral calculation for calculating an integral value of the modulation value, second integral calculation for calculating an integral value of the control value, and difference calculation for calculating a difference between the integral value of the control value and the integral value of the modulation value, in the predetermined modulation algorithm, and calculates the modulation value such that an absolute value thereof becomes equal to a predetermined value larger than a value of 1.

3. A control system for controlling an output of a controlled object by a control input to the controlled object, comprising:

control value-calculating means for calculating a control value for control of the output of the controlled object with a predetermined control algorithm; and control input-calculating means for calculating a modulation value by modulating the calculated control value with a predetermined modulation algorithm based on a Δ modulation algorithm, and calculating the control input to the controlled object based on the calculated modulation value, wherein said control input-calculating means includes integral calculation for calculating an integral value of the modulation value and difference calculation for calculating a difference between the control value and the integral value of the modulation value, in the predetermined modulation algorithm, and calculates the modulation value such that an absolute value thereof becomes equal to a predetermined value larger than a value of 1.

4. A control system as claimed in any one of claims 1 to 3, wherein the predetermined value is set to a value an absolute value of which is larger than an absolute value of the control value.

5. A control system for controlling a cam phase of at least one of an intake cam and an exhaust cam for opening and closing an intake valve and an exhaust valve of an internal combustion engine, respectively, with respect to a crankshaft, comprising:

an electromagnetic variable cam phase mechanism that includes an electromagnet and changes the cam phase by an electromagnetic force of said electromagnet;

control value-calculating means for calculating a control value for control of the cam phase with a predetermined control algorithm; and control input-calculating means for calculating a modulation value by modulating the calculated control value with a predetermined modulation algorithm based on a ΔΣ modulation algorithm, and calculating a control input to said electromagnetic variable cam phase mechanism based on the calculated modulation value, wherein said control input-calculating means includes difference calculation for calculating a difference between the control value and the modulation value, in the predetermined modulation algorithm, and calculates the modulation value such that an absolute value thereof becomes equal to a predetermined value larger than a value of 1.

6. A control system for controlling a cam phase of at least one of an intake cam and an exhaust cam for opening and closing an intake valve and an exhaust valve of an internal combustion engine, respectively, with respect to a crankshaft, comprising:

an electromagnetic variable cam phase mechanism that includes an electromagnet and changes the cam phase by an electromagnetic force of said electromagnet;

control value-calculating means for calculating a control value for control of the cam phase with a predetermined control algorithm; and control input-calculating means for calculating a modulation value by modulating the calculated control value with a predetermined modulation algorithm based on a ΔΣ modulation algorithm, and calculating a control input to said electromagnetic variable cam phase mechanism based on the calculated modulation value, wherein said control input-calculating means includes first integral calculation for calculating an integral value of the modulation value, second integral calculation for calculating an integral value of the control value, and difference calculation for calculating a difference between the integral value of the control value and the integral value of the modulation value, in the predetermined modulation algorithm, and calculates the modulation value such that an absolute value thereof becomes equal to a predetermined value larger than a value of 1.

7. A control system for controlling a cam phase of at least one of an intake cam and an exhaust cam for opening and closing an intake valve and an exhaust valve of an internal combustion engine, respectively, with respect to a crankshaft, comprising:

an electromagnetic variable cam phase mechanism that includes an electromagnet and changes the cam phase by an electromagnetic force of said electromagnet;

control value-calculating means for calculating a control value for control of the cam phase with a predetermined control algorithm; and control input-calculating means for calculating a modulation value by modulating the calculated control value with a predetermined modulation algorithm based on a Δ modulation algorithm, and calculating a control input to said electromagnetic variable cam phase mechanism based on the calculated modulation value, wherein said control input-calculating means includes integral calculation for calculating an integral value of the modulation value and difference calculation for calculating a difference between the control value and the integral value of the modulation value, in the predetermined modulation algorithm, and calculates the modulation value such that an absolute value thereof becomes equal to a predetermined value larger than a value of 1.

8. A control system as claimed in any one of claims 5 to 7, wherein the predetermined value is set to a value an absolute value of which is larger than an absolute value of the control value.

9. A control system for controlling an output of a controlled object to a target value by a control input to the controlled object, comprising:

output-detecting means for detecting the output of the controlled object;

target value-setting means for setting the target value;

control value-calculating means for calculating a control value for controlling the detected output of the controlled object to the set target value, with a predetermined control algorithm;

difference-calculating means for calculating a difference between the calculated control value and a first predetermined value; and control input-calculating means for calculating a modulation value by modulating the calculated difference with an algorithm based on one of a Δ modulation algorithm, a ΔΣ modulation algorithm, and a ΣΔ modulation algorithm, and calculating the control input to the controlled object based on the calculated modulation value.

10. A control system as claimed in claim 9, wherein said control input-calculating means calculates the control input to the controlled object as a sum of the modulation value and a second predetermined value.

11. A control system for controlling a cam phase of at least one of an intake cam and an exhaust cam for opening and closing an intake valve and an exhaust valve of an internal combustion engine, respectively, with respect to a crankshaft, to a target cam phase, comprising:

an electromagnetic variable cam phase mechanism that includes an electromagnet and changes the cam phase within a predetermined range by an electromagnetic force of said electromagnet, while holding the cam phase at one of limit values defining the predetermined range when the electromagnetic force is not acting;

cam phase-detecting means for detecting the cam phase;

target cam phase-setting means for setting the target cam phase;

control value-calculating means for calculating a control value for controlling the detected cam phase to the set target cam phase, with a predetermined control algorithm;

difference-calculating means for calculating a difference between the calculated control value and a first predetermined value; and control input-calculating means for calculating a modulation value by modulating the calculated difference with an algorithm based on one of a Δ modulation algorithm, a ΔΣ modulation algorithm, and a ΣΔ modulation algorithm, and calculating a control input to said electromagnetic variable cam phase mechanism based on the calculated modulation value.

12. A control system as claimed in claim 11, wherein said control input-calculating means calculates the control input to said electromagnetic variable cam phase mechanism as a sum of the modulation value and a second predetermined value.

* * * * *